United States Patent
Seo et al.

(10) Patent No.: US 10,938,540 B2
(45) Date of Patent: Mar. 2, 2021

(54) METHOD FOR ALLOCATING TRANSMISSION RESOURCES IN WIRELESS COMMUNICATION SYSTEM SUPPORTING DEVICE-TO-DEVICE (D2D) COMMUNICATION

(71) Applicant: LG ELECTRONICS INC., Seoul (KR)

(72) Inventors: Hanbyul Seo, Seoul (KR); Kijun Kim, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 15/537,333

(22) PCT Filed: Dec. 18, 2015

(86) PCT No.: PCT/KR2015/013937
§ 371 (c)(1),
(2) Date: Jun. 16, 2017

(87) PCT Pub. No.: WO2016/099196
PCT Pub. Date: Jun. 23, 2016

(65) Prior Publication Data
US 2017/0366328 A1    Dec. 21, 2017

Related U.S. Application Data

(60) Provisional application No. 62/094,035, filed on Dec. 18, 2014, provisional application No. 62/184,913, (Continued)

(51) Int. Cl.
*H04L 5/00* (2006.01)
*H04W 72/04* (2009.01)
*H04L 1/18* (2006.01)
*H04L 1/00* (2006.01)

(52) U.S. Cl.
CPC .......... *H04L 5/0094* (2013.01); *H04L 1/0003* (2013.01); *H04L 1/0009* (2013.01); (Continued)

(58) Field of Classification Search
None
See application file for complete search history.

(56) References Cited

U.S. PATENT DOCUMENTS

2009/0274134 A1* 11/2009 Wang ............... H04W 16/24
                                                    370/338
2013/0272262 A1  10/2013 Li et al.
(Continued)

OTHER PUBLICATIONS

PCT International Application No. PCT/KR2015/013937, Written Opinion of the International Searching Authority dated Apr. 7, 2016, 22 pages.
(Continued)

*Primary Examiner* — Kevin C. Harper
*Assistant Examiner* — Derrick V Rose
(74) *Attorney, Agent, or Firm* — Lee, Hong, Degerman, Kang & Waimey PC

(57) ABSTRACT

The present invention relates to a wireless communication system supporting device-to-device (D2D) communication. More particularly, a method for allocating transmission resources according to an embodiment of the present invention may comprise: transmitting a first D2D signal in a first resource unit; and when a second D2D signal occurs in a transmission interval of the first resource unit, transmitting the second D2D signal in a second resource unit. Further, the start point of the second resource unit may be set to a specific time point before the end point of the first resource unit.

7 Claims, 26 Drawing Sheets

Related U.S. Application Data filed on Jun. 26, 2015, provisional application No. 62/187,805, filed on Jul. 1, 2015, provisional application No. 62/213,109, filed on Sep. 2, 2015, provisional application No. 62/248,283, filed on Oct. 29, 2015.

(52) U.S. Cl.
CPC .......... *H04L 1/0026* (2013.01); *H04L 1/1861* (2013.01); *H04L 5/0016* (2013.01); *H04L 5/0051* (2013.01); *H04L 5/0055* (2013.01); *H04W 72/044* (2013.01)

(56) References Cited

U.S. PATENT DOCUMENTS

| | | | |
|---|---|---|---|
| 2014/0293968 A1* | 10/2014 | Ebrahimi Tazeh Mahalleh | H04W 56/001 370/336 |
| 2015/0029893 A1* | 1/2015 | Gulati | H04W 72/0446 370/254 |
| 2016/0044619 A1* | 2/2016 | Ryu | H04W 76/14 370/350 |
| 2016/0198507 A1* | 7/2016 | Wu | H04W 76/14 370/330 |

OTHER PUBLICATIONS

CATT, "T-RPT design for D2D communication", 3GPP TSG RAN WG1 Meeting #78, R1-142899, Aug. 2014, 4 pages.

LG Electronics, "On the Resource Pool Configuration for D2D Communications", 3GPP TSG RAN WG1 Meeting #76, R1-140332, Feb. 2014, 13 pages.

LG Electronics, "Discussion on resource allocation for D2D mode 2 communication", 3GPP TSG RAN WG1 Meeting #78, R1-143179, Aug. 2014, 10 pages.

\* cited by examiner

FIG. 10
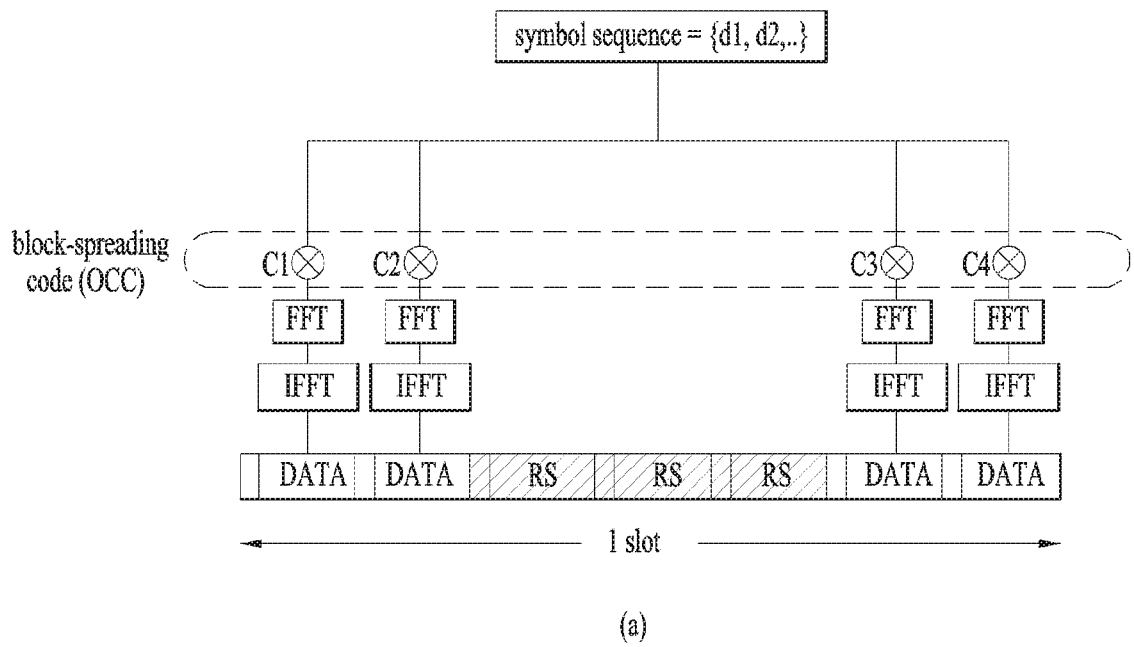
(a)
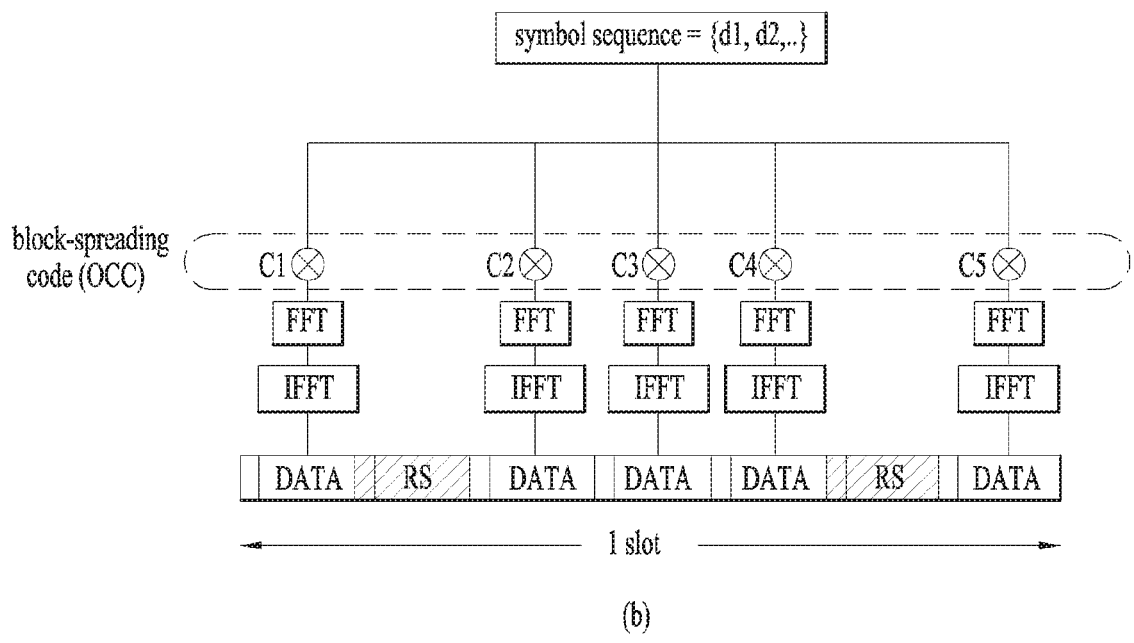
(b)

Control information

FIG. 23

METHOD FOR ALLOCATING TRANSMISSION RESOURCES IN WIRELESS COMMUNICATION SYSTEM SUPPORTING DEVICE-TO-DEVICE (D2D) COMMUNICATION

CROSS-REFERENCE TO RELATED APPLICATIONS

This application is the National Stage filing under 35 U.S.C. 371 of International Application No. PCT/KR2015/013937, filed on Dec. 18, 2015, which claims the benefit of U.S. Provisional Application No. 62/094,035, filed on Dec. 18, 2014, 62/184,913, filed on Jun. 26, 2015, 62/187,805, filed on Jul. 1, 2015, 62/213,109, filed on Sep. 2, 2015 and 62/248,283, filed on Oct. 29, 2015, the contents of which are all hereby incorporated by reference herein in their entirety.

TECHNICAL FIELD

The present disclosure relates to a wireless communication system supporting Device-to-Device (D2D) communication, and more particularly, to a method and apparatus for allocating transmission resources.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An aspect of the present disclosure is to provide a method for efficiently transmitting and receiving signals in a wireless communication system supporting Device-to-Device (D2D) communication.

Another aspect of the present disclosure is to provide various methods and apparatuses for configuring a resource structure for effective signal transmission and reception in a wireless communication system supporting D2D communication.

Another aspect of the present disclosure is to provide apparatuses supporting the above methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure, which relates to a wireless communication system supporting Device-to-Device (D2D) communication, provides a method for allocating transmission resources and apparatuses supporting the method.

In an aspect of the present disclosure, a method for allocating transmission resources by a User Equipment (UE) in a wireless communication system supporting D2D communication may include transmitting a first D2D signal in a first resource unit, and upon generation of a second D2D signal during a transmission period of the first resource unit, transmitting the second D2D signal in a second resource unit. A starting time of the second resource unit may be a specific time point before an ending time of the first resource unit.

In another aspect of the present disclosure, a method for allocating reception resources by a UE in a wireless communication system supporting D2D communication may include receiving a first D2D signal in a first resource unit, and receiving a second D2D signal in a second resource unit. A starting time of the second resource unit may be a specific time point before an ending time of the first resource unit.

In another aspect of the present disclosure, a UE for conducting D2D communication may include a transmitter for transmitting a first D2D signal in a first resource unit, and a processor. Upon generation of a second D2D signal during a transmission period of the first resource unit, the processor may control the transmitter to transmit the second D2D signal in a second resource unit, and a starting time of the second resource unit may be a specific time point before an ending time of the first resource unit.

In another aspect of the present disclosure, a UE for conducting D2D communication may include a receiver for receiving a first D2D signal in a first resource unit, and a processor. The processor may control the receiver to receive a second D2D signal in a second resource unit, and a starting time of the second resource unit may be a specific time point before an ending time of the first resource unit.

The following may be applied commonly to the aspect of the present disclosure.

The difference between the starting time of the first resource unit and a starting time of the second resource unit may be set in units of a subframe.

More specifically, the first resource unit may include a plurality of subframes, and a boundary of the second resource unit may be aligned with a specific one of the plurality of subframes, except for a first subframe of the plurality of subframes.

Preferably, the plurality of subframes included in the first resource unit may be spaced from each other by at least one subframe. More preferably, the plurality of subframes included in the first resource unit may be spaced from each other by at least three subframes.

Meanwhile, a frequency area of the first resource unit may be set in a different frequency from a frequency area of the second resource unit.

Or, the frequency areas of the first and second resource units may be set in the same frequency.

Meanwhile, a control signal for the first D2D signal may be positioned in a starting part of the first resource unit, and a control signal for the second D2D signal may be positioned in a starting part of the second resource unit.

At least one of the control signal for the first D2D signal or the control signal for the second D2D signal may be mapped to at least one of partitions into which a frequency area of a resource unit corresponding to the at least one control signal is divided.

Further, at least one of the control signal for the first D2D signal or the control signal for the second D2D signal may be transmitted in a different frequency area from a data signal linked to the control signal.

Meanwhile, the first resource unit and the second resource unit may have frequency areas of different sizes in an overlapped time area.

Or each of the first resource unit and the second resource unit may include a plurality of time-domain transmission units, and a different frequency area may be configured for each of the time-domain transmission units.

The above solutions are merely a part of embodiments of the present disclosure, and those skilled in the art will derive and understand various embodiments reflecting the technical features of the present disclosure from the following detailed description of the present disclosure.

Advantageous Effects

According to the embodiments of the present disclosure, signals can be efficiently transmitted and received in a wireless communication supporting Device-to-Device (D2D) communication.

Various methods for configuring a resource structure for effective signal transmission and reception and apparatuses supporting the methods in a wireless communication system supporting D2D communication can be provided.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 10 is a view illustrating a PUCCH structure using block spreading;

FIG. 23 is a view illustrating another exemplary method for configuring RUSs according to another embodiment of the present disclosure;

BEST MODE FOR CARRYING OUT THE INVENTION

Figure 1:
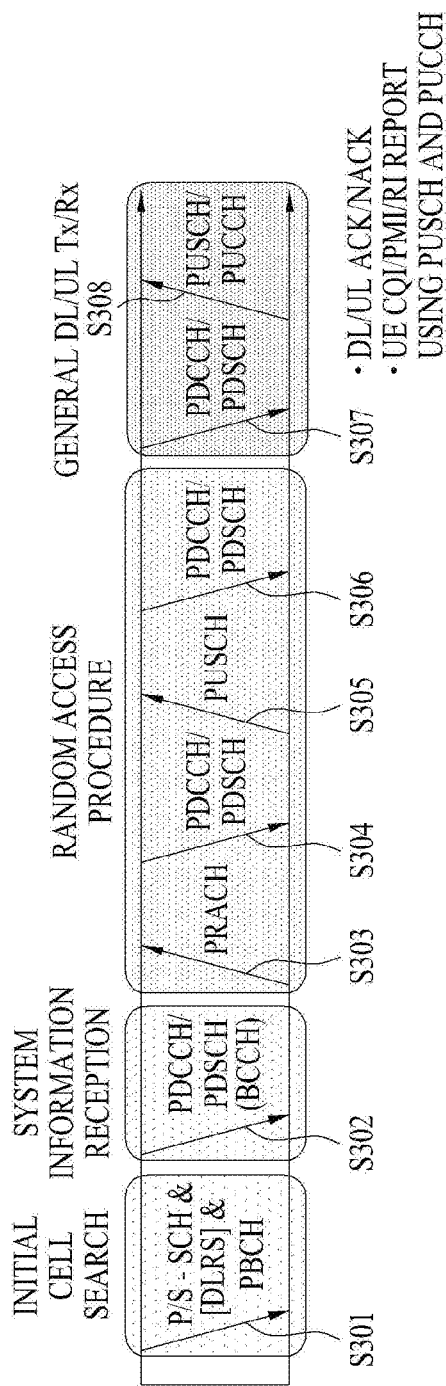
FIG. 1 is a view illustrating physical channels and a signal transmission method using the physical channels.

Embodiments of the present disclosure, which relate to a wireless communication system supporting Device-to-Device (D2D) communication, provide a method for allocating transmission resources and apparatuses supporting the method.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, $3^{rd}$ Generation Partnership Project (3GPP) Long Term Evolution/Long Term Evolution-Advanced (LTE/LTE-A) systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-1-DMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
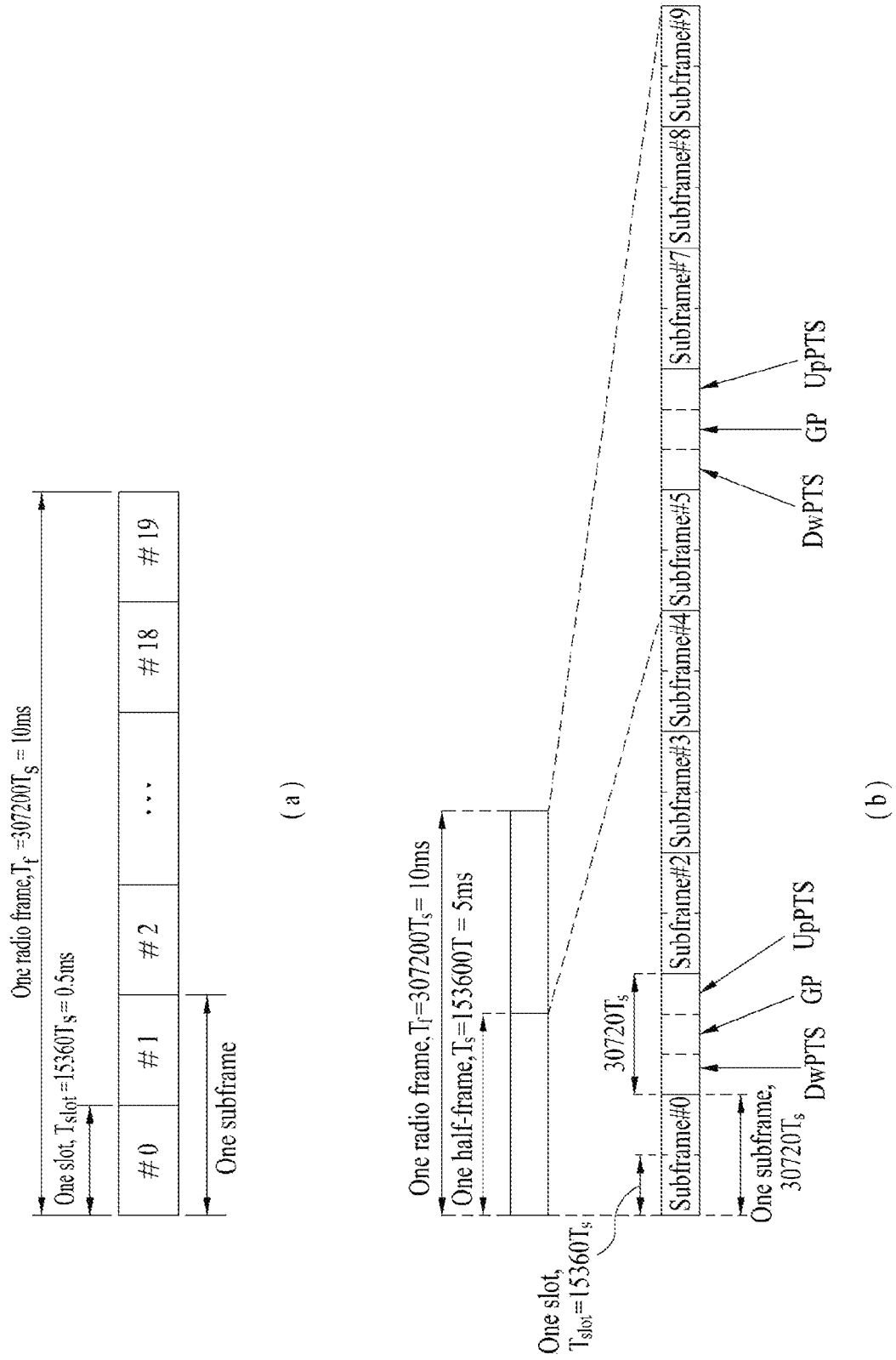
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | | Extended cyclic prefix in downlink | |
| --- | --- | --- | --- | --- | --- | --- |
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
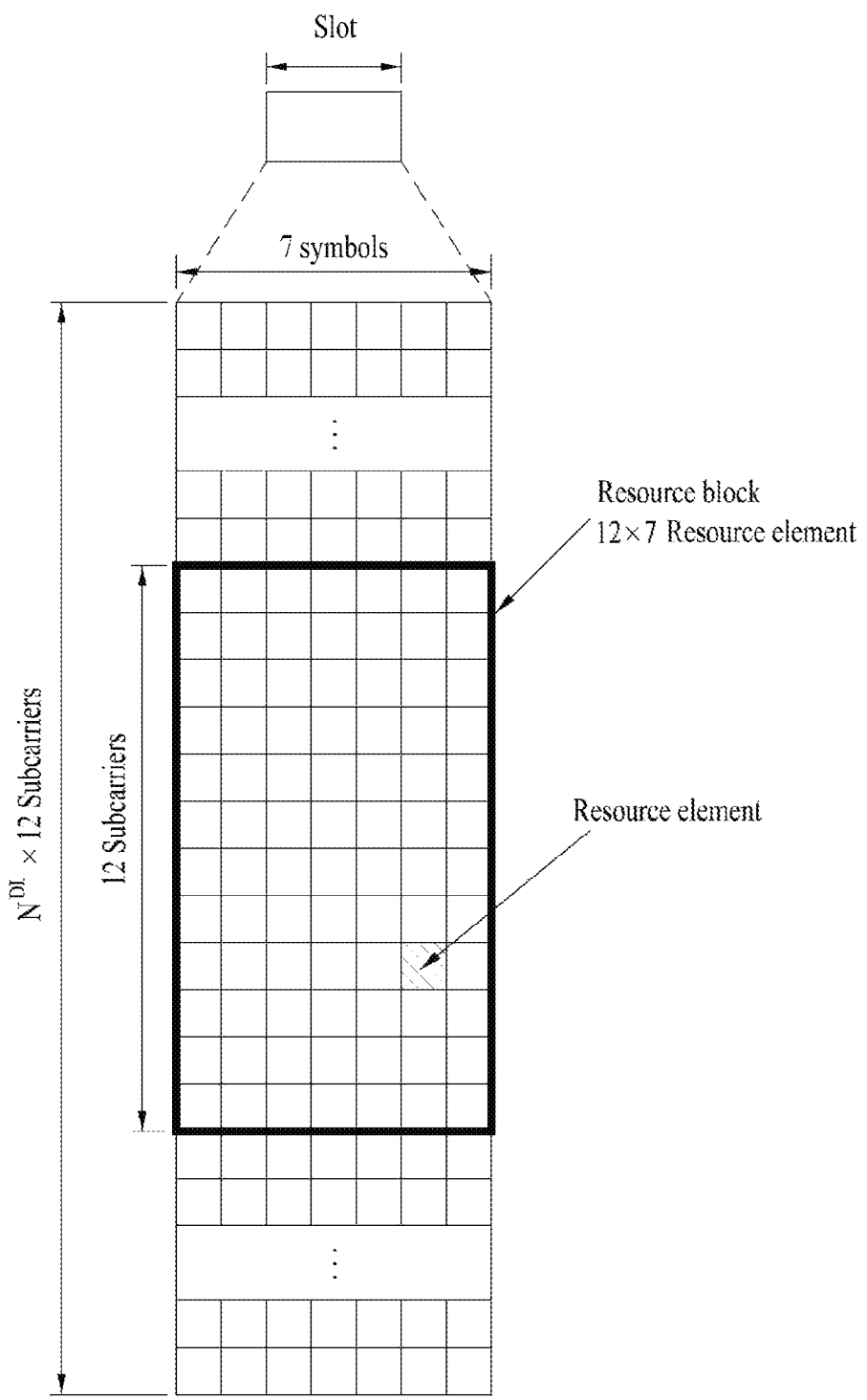
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
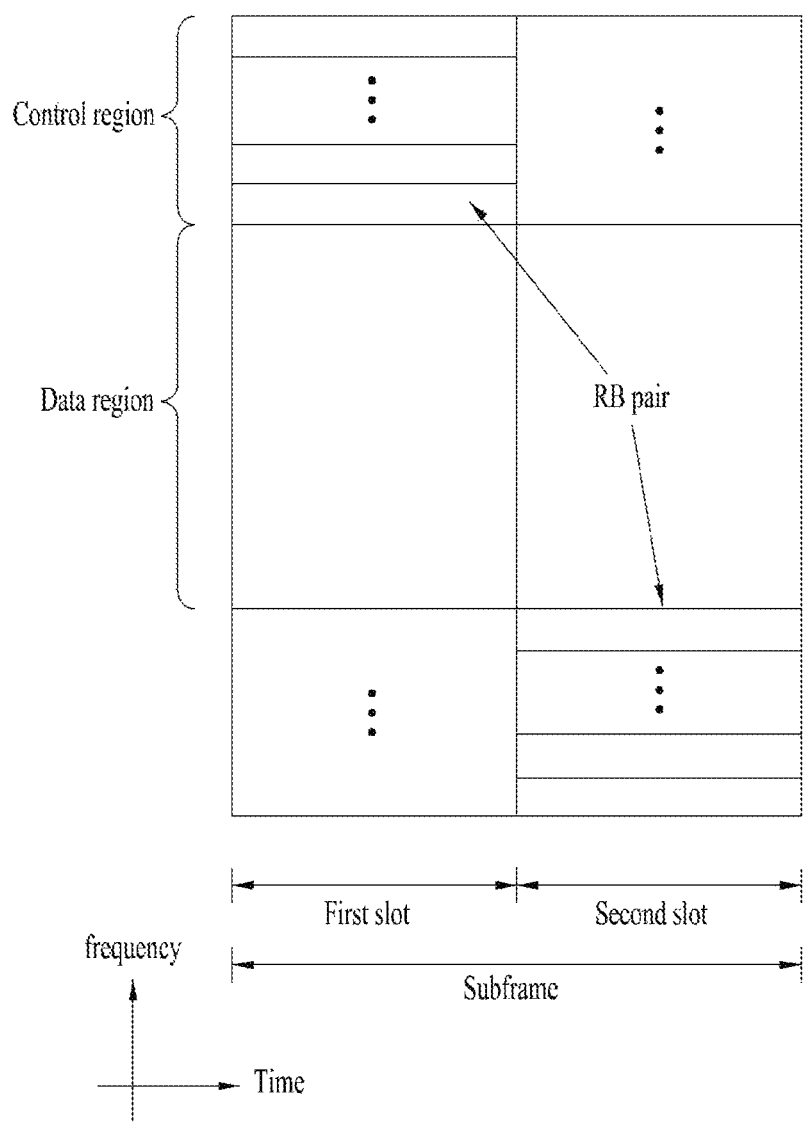
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
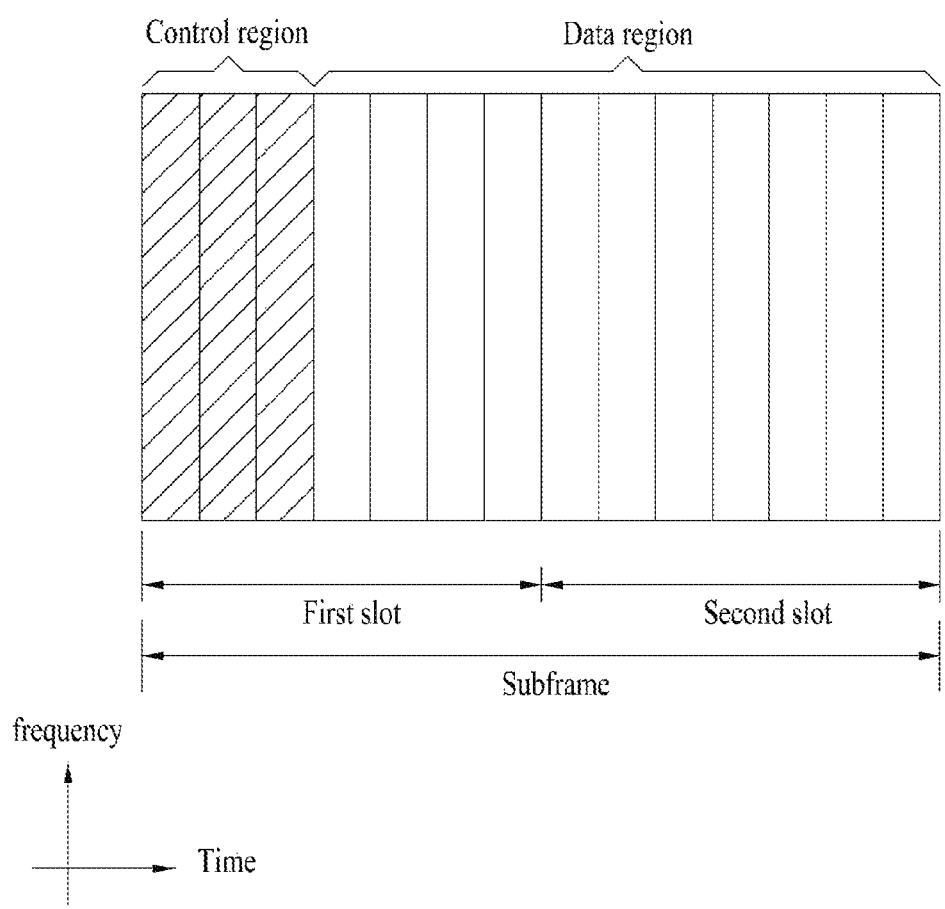
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Synchronization Signal

When a UE is powered on or intends to access a new cell, the UE performs an initial cell search procedure in which it acquires time synchronization and frequency synchronization with a cell, and detects the physical layer cell Identifier (ID) of the cell, NCellID. For this purpose, the UE may be synchronized with an eNB and acquire information such as a cell ID by receiving, from the eNB, synchronization signals, for example, a Primary Synchronization Signal (PSS) and a Secondary Synchronization Signal (SSS) on a Primary Synchronization Channel (P-SCH) and a Secondary Synchronization Channel (S-SCH).

Specifically, to acquire time-domain synchronization such as OFDM symbol synchronization and slot synchronization, and/or frequency-domain synchronization by means of the PSS, a Zadoff-Chu (ZC) sequence of length 63 is defined in the frequency domain and used as PSS d(n) according to [Equation 1].

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 1]}$$

In [Equation 1], u represents the index of a ZC root sequence. The current LTE system defines u as listed in [Table 2].

TABLE 2

| $N_{ID}^{(2)}$ | Root index u |
|---|---|
| 0 | 25 |
| 1 | 29 |
| 2 | 34 |

The SSS is used to acquire frame synchronization, a cell group ID, and/or a Cyclic Prefix (CP) configuration of the cell (i.e., information indicating whether a normal CP or an extended CP is used). An SSS sequence of length 62, d(0), . . . , d(61) is configured by interleaving two binary sequences each having length 31. As illustrated in [Equation 2], a different SSS sequence is defined depending on whether it is transmitted in subframe #0 or subframe #5. In [Equation 2], n is 0 or an integer greater than 0 and equal to or less than 30.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 2]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

More specifically, the synchronization signals are transmitted in the first slot of subframe #0 and the first slot of subframe #5 in consideration of the length of a GSM frame, 4.6 ms in order to facilitate inter-Radio Access Technology (inter-RAT) measurement. Particularly, the PSS is transmitted in the last OFDM symbol of the first slot of subframe #0 and the last OFDM symbol of the first slot of subframe #5, whereas the SSS is transmitted in the second last OFDM symbol of the first slot of subframe #0 and the second last OFDM symbol of the first slot of subframe #5. The boundary of a corresponding radio frame may be detected by the SSS. The PSS is transmitted in the last OFDM symbol of a corresponding slot, and the SSS is transmitted in the OFDM symbol previous to the PSS.

504 unique physical layer cell IDs may be produced by combining 3 PSSs with 168 SSs. In other words, the physical layer cell IDs are grouped into 168 physical layer cell ID groups each including 3 unique IDs, so that each physical layer cell ID may become a part of only one physical cell ID group. Accordingly, a physical layer cell ID, $N^{cell}_{ID}$ is uniquely defined by the index of a physical layer cell ID group, $N^{(1)}_{ID}$ ranging from 0 to 167 and a physical layer ID, $N^{(2)}_{ID}$ in the physical layer cell ID group, ranging from 0 to 2. The UE may determine one of 3 unique physical layer IDs by detecting the PSS, and identify one of 168 physical layer cell IDs associated with the physical layer ID.

Since the PSS is transmitted every 5 ms, the UE may determine that a corresponding subframe is one of subframe #0 and subframe #5 by detecting the PSS. However, the UE has no way to determine whether the subframe is subframe #0 or subframe #5. Therefore, the UE may not identify the boundary of a radio frame only with the PSS. In other words, the UE may not acquire frame synchronization only with the PSS. The UE detects the boundary of the radio frame by detecting the SSS which is transmitted twice as different sequences in one radio frame.

In this manner, the UE may be synchronized with the eNB and acquire information such as a cell ID by receiving the PSS and the SSS from the eNB, for cell search/research. Subsequently, the UE may receive broadcasting information on a PBCH within the cell managed by the eNB.

1.3 Physical Downlink Control Channel (PDCCH)

1.3.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.3.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 3] below illustrates PDCCH formats. 4 PDCCH formats are supported according to CCE aggregation levels as illustrated in [Table 3].

TABLE 3

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 4] lists DCI according to DCI formats.

TABLE 4

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 4], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.3.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.3.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 5] illustrates the sizes of CSSs and USSs.

TABLE 5

| PDCCH Format | Number of CCE (n) | Number of candidates in CSS | Number of candidates in USS |
| --- | --- | --- | --- |
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format 0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\} + i \quad \text{[Equation 3]}$$

Herein, $M^{(L)}$ is the number of PDCCH candidates with CCE aggregation level L to be monitored in the SS, m=0, $M^{(L)}-1$, is the index of a CCE in each PDCCH candidate, and i=0, L−1. $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 6

| | Search space $S_k^{(L)}$ | | Number of PDCCH |
|---|---|---|---|
| Type | Aggregation level L | Size [in CCEs] | candidates $M^{(L)}$ |
| UE- | 1 | 6 | 6 |
| specific | 2 | 12 | 6 |
| | 4 | 8 | 2 |
| | 8 | 16 | 2 |
| Common | 4 | 16 | 4 |
| | 8 | 16 | 2 |

Referring to [Equation 3], for two aggregation levels, L=4 and L=8, $Y_k$ is set to 0 in the CSS, whereas $Y_k$ is defined by [Equation 4] for aggregation level L in the USS.

$$Y_k = (A \cdot Y_{k-1}) \bmod D \quad \text{[Equation 4]}$$

Herein, $Y_{-1}=n_{RNTI} \neq 0$, $n_{RNTI}$ indicating an RNTI value. A=39827 and D=65537.

1.4 PUCCH (Physical Uplink Control Channel)
1.4.1 PUCCH Overview

Uplink control information transmitted on PUCCH may include SR (Scheduling Request), HARQ ACK/NACK information, and DL channel measurement information.

The HARQ ACK/NACK information can be generated according to whether a decoding of a DL data packet on PDSCH is succeeded. In a legacy wireless communication system, 1 bit as the ACK/NACK information is transmitted for a DL single codeword transmission and 2 bits as the ACK/NACK information are transmitted for DL 2 codeword transmission.

The channel measurement information indicates feedback information related to a MIMO (Multiple Input Multiple Output) scheme and can include a channel quality indicator (CQI), a precoding matrix index (PMI), and a rank indicator (RI). The aforementioned channel measurement information may be commonly called a CQI. 20 bits per subframe can be used to transmit the CQI.

PUCCH can be modulated using BPSK (binary phase shift keying) and QPSK (quadrature phase shift keying) scheme. Control information of a plurality of UEs can be transmitted on the PUCCH. In case of performing code division multiplexing (CDM) to distinguish a signal of each of the UEs, constant amplitude zero autocorrelation (CAZAC) sequence of length 12 is mainly used. Since the CAZAC sequence has a characteristic of maintaining constant amplitude in time domain and frequency domain, the CAZAC sequence has an appropriate property to increase coverage in a manner of lowering peak-to-average power ratio (PARR) or cubic metric (CM) of a UE. And, the ACK/NACK information on a DL data transmission transmitted on the PUCCH is covered using an orthogonal sequence or an orthogonal cover (OC).

And, the control information transmitted on the PUCCH can be distinguished using a cyclically shifted sequence including a cyclic shift (CS) value different from each other. The cyclically shifted sequence can be generated in a manner that a base sequence is cyclically shifted as much as a specific cyclic shift (CS) amount. The specific CS amount is indicated by a CS index. The number of available cyclic shift may vary according to a delay spread of a channel. Various types of sequences can be used as the base sequence and the aforementioned CAZAC sequence corresponds to one example of the base sequence.

And, the amount of control information capable of being transmitted by a UE in a subframe can be determined according to the number (i.e., SC-FDMA symbols except an SC-FDMA symbol used for transmitting a reference signal (RS) to detect coherent of the PUCCH) of SC-FDMA symbol available to transmit the control information.

PUCCH format 1 is used to solely transmit an SR. In case of solely transmitting the SR, a wave, which is not modulated, is applied. This shall be described in detail later.

PUCCH format 1a or 1b is used to transmit HARQ ACK/NACK. In case of solely transmitting the HARQ ACK/NACK in a random subframe, the PUCCH format 1a or 1b can be used. Or, the HARQ ACK/NACK and the SR may be transmitted in an identical subframe using the PUCCH format 1a or 1b.

PUCCH format 2 is used to transmit a CQI and PUCCH format 2a or 2b is used to transmit the CQI and the HARQ ACK/NACK. In case of an extended CP, the PUCCH format 2 may be used to transmit the CQI and the HARQ ACK/NACK.

Figure 6:
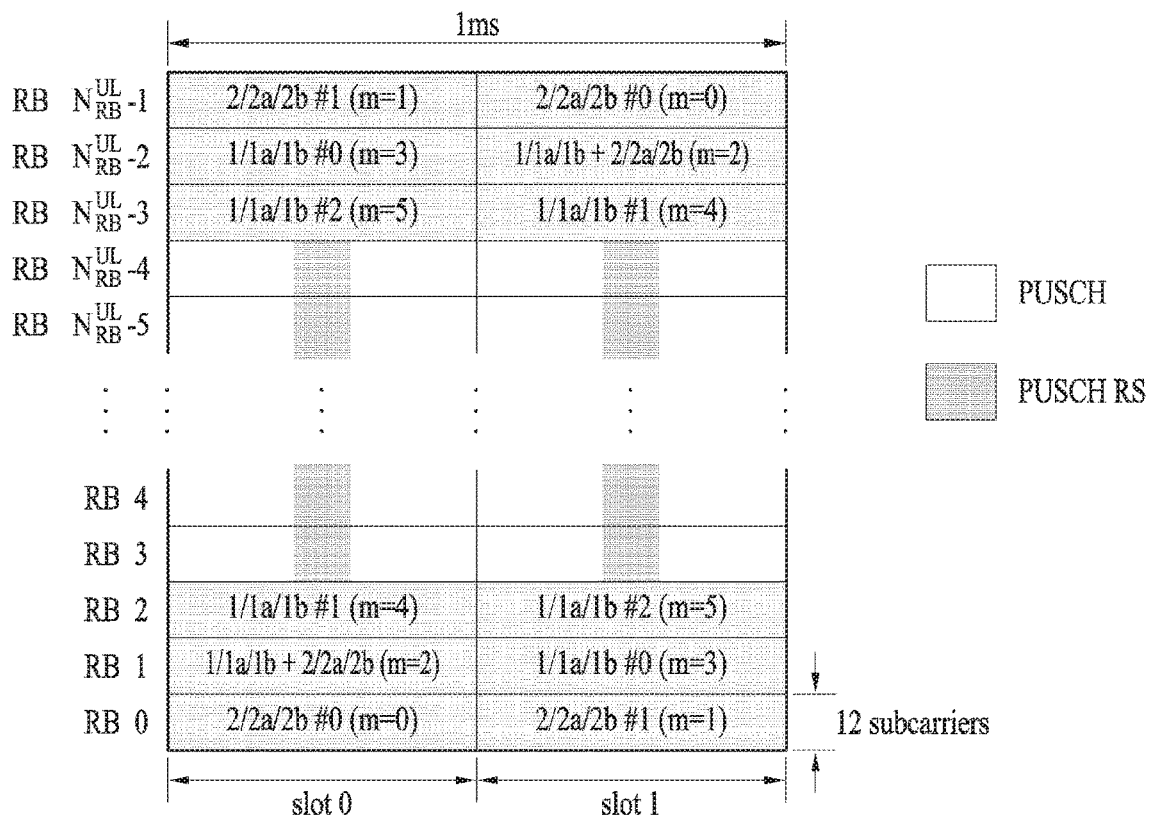
FIG. 6 is a view illustrating mapping between Physical Uplink Control Channel (PUCCH) formats and uplink Physical Resource Blocks (PRBs)

FIG. 6 is a view illustrating mapping between PUCCH formats and uplink Physical Resource Blocks (PRBs). Referring to FIG. 5, $N_{RB}^{UL}$ indicates the number of resource blocks in UL and 0, 1, ... $N_{RB}^{UL}-1$ means numbers of the physical resource block. Basically, PUCCH is mapped to both edges of a UL frequency block. As depicted in FIG. 5, PUCCH format 2/2a/2b are mapped to the PUCCH region displayed as m=0, 1. This may represent that the PUCCH format 2/2a/2b are mapped to resource blocks situated at a band-edge. And, the PUCCH format 2/2a/2b and PUCCH format 1/1a/1b can be mapped to a PUCCH region displayed as m=2 in a manner of being mixed. The PUCCH format 1/1a/1b can be mapped to a PUCCH region displayed as m=3, 4, 5. The number ($N_{RB}^{(2)}$) of PUCCH RBs usable by the PUCCH format 2/2a/2b can be directed to UEs in a cell by a broadcasting signaling.

1.4.2. PUCCH Resources

A BS assigns a PUCCH resource for transmitting UCI to a UE by an explicit scheme via a higher layer signaling or an implicit scheme.

In case of ACK/NACK, a plurality of PUCCH resource candidates can be configured to a UE by a higher layer and which PUCCH resource is used among a plurality of the PUCCH resource candidates can be determined by the implicit scheme. For instance, the UE receives PDSCH from the BS and the ACK/NACK for a corresponding data unit can be transmitted via the PUCCH resource implicitly determined by PDCCH resource carrying scheduling information on the PDSCH.

Figure 7:
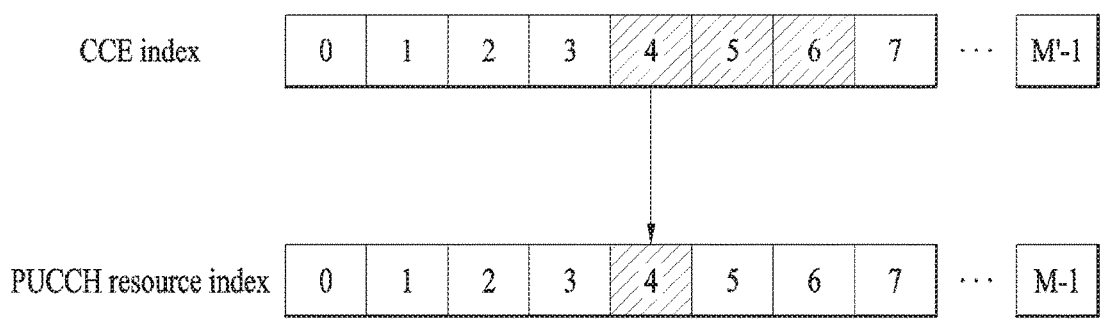
FIG. 7 is a view illustrating exemplary determination of PUCCH resource for an Acknowledgement/Negative Acknowledgment (ACK/NACK)

FIG. 7 is a view illustrating exemplary determination of PUCCH resource for an Acknowledgement/Negative Acknowledgment (ACK/NACK).

In the LTE system, a PUCCH resource for an ACK/NACK is not assigned to each UE in advance. Instead, a plurality of UEs in a cell uses a plurality of PUCCH resources on every timing point in a manner of dividing a plurality of the PUCCH resources. Specifically, the PUCCH resource used for transmitting the ACK/NACK by the UE is determined by an implicit scheme based on the PDCCH carrying scheduling information on PDSCH, which carries a corresponding DL data. A whole region to which the PDCCH is transmitted in each DL subframe consists of a plurality of Control Channel Elements (CCE). And, the PDCCH transmitted to the UE consists of one or more CCEs. The CCE includes a plurality of Resource Element Groups (REGs). One REG consists of 4 adjacent Resource Elements (REs) except Reference Signals (RSs). The UE transmits the ACK/NACK via an implicit resource derived or calculated by a function of a specific CCE index (e.g., a first or a lowest CCE index) among the indexes of CCEs for configuring the PDCCH received by the UE.

Referring to FIG. 7, each of the PUCCH resource indexes corresponds to the PUCCH resource for the ACK/NACK. If it is assumed that scheduling information on PDSCH is transmitted to a UE via PDCCH configured with $4^{th} \sim 6^{th}$ CCE, the UE transmits the ACK/NACK to the BS via PUCCH, e.g., $4^{th}$ PUCCH, derived or calculated by the index of the $4^{th}$ CCE, which is the lowest CCE for configuring the PDCCH. FIG. 7 shows an example that maximum M' number of CCE exist in DL and maximum M number of PUCCH exist in UL. Although the M' and the M may be identical to each other, it is also possible to design a value of the M' to be different from a value of the M. And, it is also possible to make mapping of the CCE overlap the mapping of the PUCCH resource.

For instance, the PUCCH resource index may be determined as follows.

$$n_{PUCCH}(1) = n_{CCE} + N_{PUCCH}(1)$$ [Equation 5]

In this case, n(1)PUCCH indicates the PUCCH resource index to transmit the ACK/NACK and N(1)PUCCH indicates a signaling value delivered from a upper layer. The nCCE may indicate a smallest value among the CCE indexes used for PDCCH transmission. PUCCH is explained in more detail in the following description.

1.4.3. PUCCH Structure

First of all, PUCCH format 1a and 1b are explained.

In the PUCCH format 1a/1b, a symbol modulated using the BPSK or QPSK modulation scheme is multiplied by a CAZAC sequence of length 12. For instance, a result of multiplying a modulated symbol d(0) by a CAZAC sequence r(n) of length N corresponds to y(0), y(1), y(2), . . . , y(N−1). The y(0), . . . , the y(N−1) symbols may be called a symbol block (block of symbol). After a modulated symbol is multiplied by a CAZAC sequence, a block-wise spreading using an orthogonal sequence is applied.

For normal ACK/NACK information, a Hadamard sequence of length 4 is used. For shortened ACK/NACK information and a reference signal, a Discrete Fourier Transform (DFT) sequence of length 3 is used. For a reference signal in case of an extended CP, a Hadamard sequence of length 2 is used.

Figure 8:
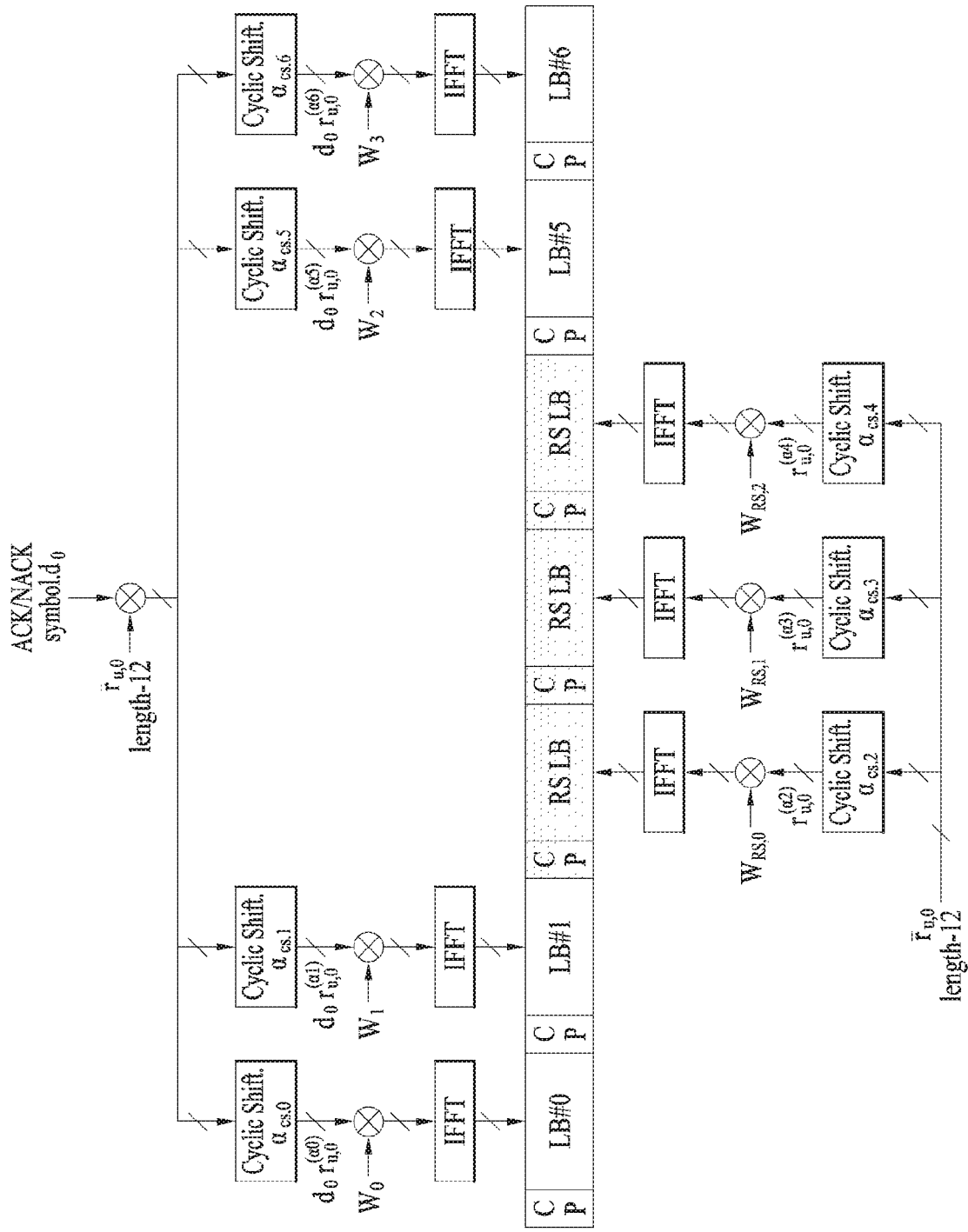
FIG. 8 is a view illustrating a structure of an ACK/NACK channel in a normal Cyclic Prefix (CP) case.

FIG. 8 is a diagram for a structure of an ACK/NACK channel in case of a normal CP. A PUCCH channel structure to transmit HARQ ACK/NACK without a CQI is exemplified in FIG. 8. Among the 7 SC-FDMA symbols included in one slot, three consecutive SC-FDMA symbols in the middle part of the slot load an RS and the rest of 4 SC-FDMA symbols load an ACK/NACK signal. Meanwhile, in case of an extended CP, two consecutive symbols situated in the middle may load the RS. The number of symbol and the position of symbol used for the RS may vary according to a control channel. And, the number of symbol and the position of symbol used for the ACK/NACK signal may vary according to the control channel as well.

Confirmation response information (in a state of not scrambled) of 1 bit and 2 bits can be represented as one HARQ ACK/NACK modulated symbol using BPSK and QPSK modulation scheme, respectively. A positive confirmation response (ACK) can be encoded by '1' and a negative confirmation response (NACK) can be encoded by '0'.

When a control signal is transmitted in an assigned band, 2 dimensional spread is applied to increase a multiplexing capacity. In particular, frequency domain spread and time domain spread are simultaneously applied to increase the number of UE and the number of control channel capable of being multiplexed. In order to spread the ACK/NACK signal in frequency domain, a frequency domain sequence is used as a base sequence. As the frequency domain sequence, a Zadoff-Chu (ZC) sequence, which is one of the CAZAC sequence, can be used. For instance, by applying a cyclic shift (CS) different from each other to the ZC sequence, which is the base sequence, multiplexing of UEs different from each other or multiplexing of control channels different from each other can be applied. The number of CS resource, which is supported by a SC-FDMA symbol for PUCCH RBs, to transmit the HARQ ACK/NACK is configured by a cell-specific upper layer signaling parameter $(\Delta_{shift}^{PUCCH})$ and $\Delta_{shift}^{PUCCH} \in \{1, 2, 3\}$ indicates 12, 6, or 4 shift, respectively.

A frequency domain spread ACK/NACK signal is spread in time domain using an orthogonal spreading code. As the orthogonal spreading code, a Walsh-Hadamard sequence or a DFT sequence can be used. For instance, an ACK/NACK signal can be spread for 4 symbols using an orthogonal sequence (w0, w1, w2, w3) of length 4. And, an RS is spread using an orthogonal sequence of length 3 or length 2. This is called an orthogonal covering (OC).

As mentioned in the foregoing description, a plurality of UEs can be multiplexed by a code division multiplexing (CDM) scheme using a CS resource in frequency domain and an OC resource in time domain. In particular, the ACK/NACK information and the RS of a plurality of the UEs can be multiplexed on an identical PUCCH RB.

For the aforementioned time domain spread CDM, the number of spreading codes supporting the ACK/NACK information is restricted by the number of RS symbols. In particular, since the number of SC-FDMA symbols transmitting the RS is less than the number of SC-FDMA symbols transmitting the ACK/NACK information, multiplexing capacity of the RS is smaller than the multiplexing capacity of the ACK/NACK information. For instance, in case of a normal CP, the ACK/NACK information can be transmitted in four symbols. In this case, not four orthogonal spreading codes but three orthogonal spreading codes are used for the ACK/NACK information. This is because only three orthogonal spreading codes can be used for the RS, since the number of RS transmission symbol is restricted to three.

An example of the orthogonal sequence used for the spread of the ACK/NACK information is shown in Table 7 and Table 8. Table 7 indicates a sequence for a symbol of length 4 and Table 8 indicates a sequence for a symbol of length 3. The sequence for the symbol of length 4 is used in PUCCH format 1/1a/1b of a normal subframe configuration. In case of configuring a subframe, the sequence for the symbol of length 4 is applied in a first slot and a shortened PUCCH format 1/1a/1b of the sequence for a symbol of length 3 can be applied in a second slot in consideration of a case that a Sounding Reference Signal (SRS) is transmitted in a last symbol of the second slot.

TABLE 7

| sequence index | {w(0), w(1), w(2), w(3)} |
|---|---|
| 0 | [+1 +1 +1 +1] |
| 1 | [+1 −1 +1 −1] |
| 2 | [+1 −1 −1 +1] |

TABLE 8

| sequence index | (0), w(1), w(2), w(3)} |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Meanwhile, exemplary orthogonal sequences used for RS spreading in an ACK/NACK channel are listed in [Table 9].

TABLE 9

| sequence index | normal CP | extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

In case that 3 symbols are used for RS transmission and 4 symbols are used for ACK/NACK information transmission in a subframe of a normal CP, for instance, if 6 Cyclic Shifts (CSs) in frequency domain and 3 Orthogonal Cover (OC) resources in time domain are available, HARQ confirmation responses from a total 18 different UEs can be multiplexed in one PUCCH RB. In case that 2 symbols are used for RS transmission and 4 symbols are used for ACK/NACK information transmission in a subframe of an extended CP, for instance, if 6 CSs in frequency domain and 2 OC resources in time domain are available, HARQ confirmation responses from a total 12 different UEs can be multiplexed in one PUCCH RB.

Subsequently, PUCCH format 1 is explained. A Scheduling Request (SR) is transmitted in a manner that a UE makes a request to be scheduled or the UE does not make a request to be scheduled. An SR channel reuses an ACK/NACK channel structure of a PUCCH format 1a/1b and is configured with an On-Off Keying (OOK) scheme based on an ACK/NACK channel design. A reference signal is not transmitted on the SR channel. Hence, a sequence of length 7 is used in case of a normal CP and a sequence of length 6 is used in case of an extended CP. A different cyclic shift or an orthogonal cover can be assigned to an SR and an ACK/NACK. In particular, a UE transmits a HARQ ACK/NACK via a resource allocated for an SR to transmit a positive SR. The UE transmits the HARQ ACK/NACK via a resource allocated for an ACK/NACK to transmit a negative SR.

Subsequently, PUCCH format 2/2a/2b is explained. The PUCCH format 2/2a/2b is a control channel to transmit a channel measurement feedback (CQI, PMI, RI).

A reporting cycle of the channel measurement feedback (hereinafter commonly called CQI information) and a frequency unit (or a frequency resolution), which becomes an object of measuring, can be controlled by an eNB. A periodic and an aperiodic CQI report can be supported in time domain. A PUCCH format 2 is used for the periodic report only and PUSCH can be used for the aperiodic report. In case of the aperiodic report, an eNB can direct a UE to transmit a scheduled resource in a manner of loading a separate CQI report on the scheduled resource to transmit a UL data.

Figure 9:
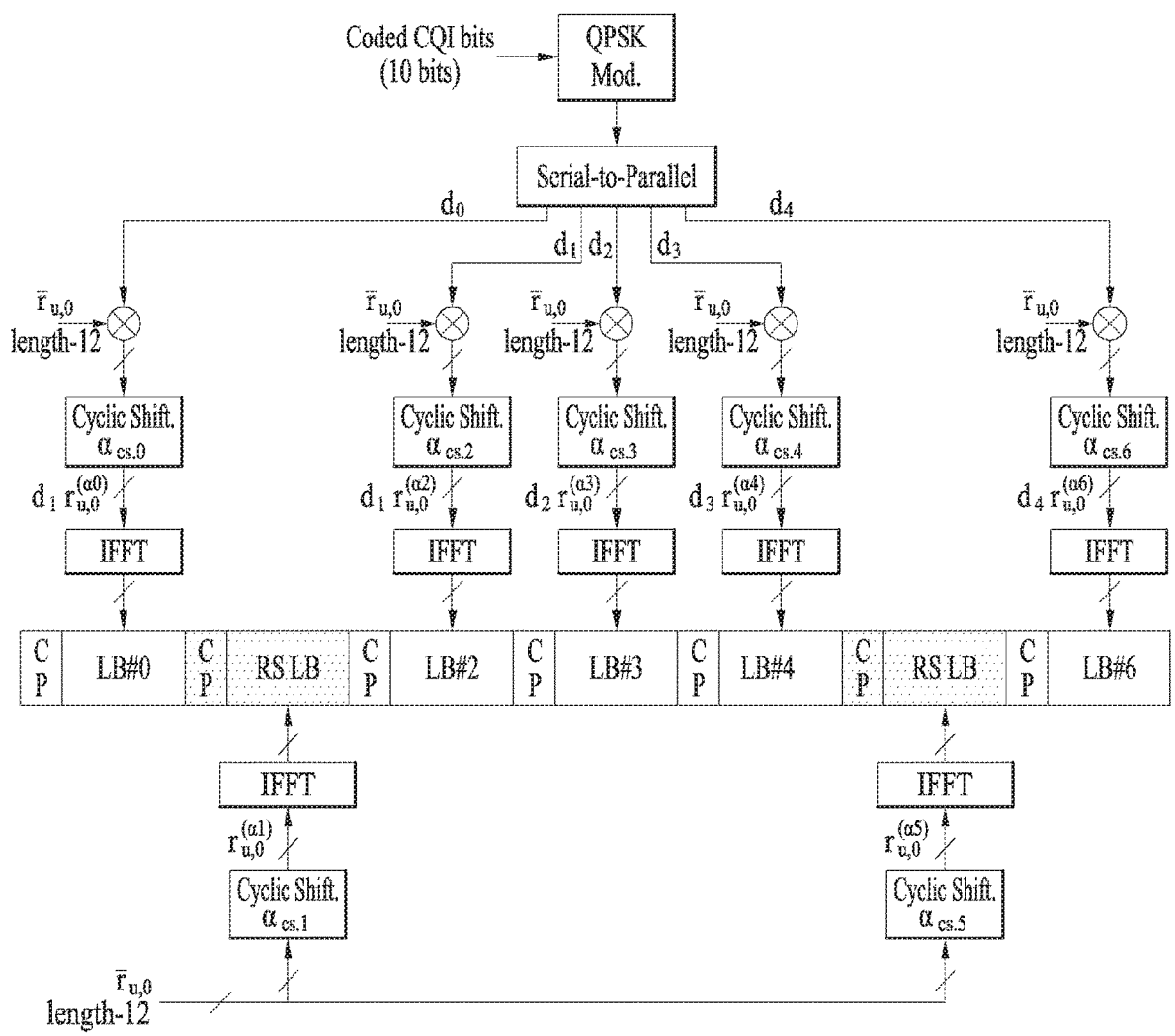
FIG. 9 is a view illustrating a structure of a Channel Quality Indicator (CQI) channel in a normal CP case.

FIG. 9 is a view illustrating a structure of a CQI channel in a normal CP case. Among FDMA symbols 0 to 6 in one slot, SC-FDMA symbols 1 and 5 (i.e., second and sixth symbols) are used to transmit a Demodulation Reference Signal (DMRS) and the rest of the SC-FDMA symbols are used to transmit CQI information. Meanwhile, in case of an extended CP, one SC-FDMA symbol (i.e., SC-FDMA symbol 3) is used to transmit a DMRS.

PUCCH format 2/2a/2b supports a modulation performed by a CAZAC sequence and a symbol modulated by QPSK scheme is multiplied by a CAZAC sequence of length 12. A CS of a sequence is modified between a symbol and a slot. An orthogonal covering is used for a DMRS.

Among the 7 SC-FDMA symbols included in one slot, an RS (DMRS) is loaded on 2 SC-FDMA symbols apart from as much as a space of 3 SC-FDMA symbols and CQI information is loaded on the rest of the 5 SC-FDMA symbols. Using two RSs in one slot is to support a fast UE. And, each UE is distinguished using a CS sequence. CQI information symbols are delivered to all SC-FDMA symbols in a manner of being modulated and an SC-FDMA symbol is configured with one sequence. In particular, a UE transmits a CQI in a manner of modulating the CQI with each sequence.

The number of symbols capable of being transmitted in one TTI corresponds to 10 and a modulation scheme of CQI information is determined up to QPSK. In case of using QPSK mapping for an SC-FDMA symbol, since a CQI value of 2-bit can be loaded, the CQI value of 10-bit can be loaded in one slot. Hence, the CQI value of maximum 20 bits can be loaded in one subframe. A frequency domain spreading code is used to spread the CQI information in frequency domain.

A CAZAC sequence (e.g., a ZC sequence) of length 12 can be used as the frequency domain spreading code. Each control channel can be distinguished by applying the CAZAC sequence including a cyclic shift value different from each other. An IFFT is performed on the frequency domain spread CQI information.

12 different UEs can be orthogonally multiplexed in an identical PUCCH RB by 12 equidistant CSs. In case of a normal CP, a DMRS sequence on the SC-FDMA symbol 1 and 5 (in case of an extended CP, SC-FDMA symbol 3) is similar to a CQI signal sequence in frequency domain. Yet, a modulation applied to the CQI information is not applied to the DMRS sequence. A UE can be semi-statically configured by an upper layer signaling to periodically report different types of CQI, PMI and RI on a PUCCH resource indicated by a PUCCH resource index ($n_{PUCCH}^{(2)}$). In this case, the PUCCH resource index ($n_{PUCCH}^{(2)}$) is information to indicate a PUCCH region used for PUCCH format 2/2a/2b transmission and a cyclic shift (CS) value to be used.

Subsequently, an enhanced-PUCCH (e-PUCCH) format is explained. The e-PDCCH may correspond to a PUCCH format 3 of LTE-A system. A block spreading scheme can be applied to an ACK/NACK transmission using the PUCCH format 3.

Unlike a legacy PUCCH format 1 series or 2 series, the block spreading scheme is a scheme for modulating a control signal transmission using an SC-FDMA scheme. As shown in FIG. 10, a symbol sequence can be transmitted in time domain in a manner of being spread using an orthogonal cover code (OCC). By using the OCC, control signals of a plurality of UEs in an identical RB can be multiplexed. In case of the aforementioned PUCCH format 2, one symbol sequence is transmitted in a manner of being spanned in time domain and the control signals of a plurality of the UEs are multiplexed using the CS (cyclic shift) of the CAZAC sequence. On the other hand, in case of the block spreading-based PUCCH format (e.g., PUCCH format 3), one symbol sequence is transmitted in a manner of being spanned in frequency domain and the control signals of a plurality of the UEs are multiplexed by using time domain spreading using the OCC.

FIG. 10(a) indicates an example of generating 4 SC-FDMA symbols (i.e., data part) using an OCC of length 4 (or Spreading Factor (SF)=4) in one symbol sequence and are transmitted in one slot. In this case, 3 RS symbols (i.e., RS part) can be used in one slot.

FIG. 10(b) indicates an example of generating 5 SC-FDMA symbols (i.e., data part) using an OCC of length 5 (or SF=5) in one symbol sequence and are transmitted in one slot. In this case, 2 RS symbols can be used in one slot.

Referring to the example of FIG. 10, the RS symbol can be generated from a CAZAC sequence to which a specific cyclic shift value is applied and can be transmitted in a form that a prescribed OCC is applied (or multiplied) to a plurality of RS symbols. And, in the example of FIG. 10, if it is assumed that 12 modulation symbols are used according to each OFDM symbol (or SC-FDMA symbol) and each modulation symbol is generated by QPSK scheme, maximum bit number capable of being transmitted in one slot becomes 12*2=24 bits. Hence, the bit number capable of being transmitted by 2 slots becomes a total 48 bits. As mentioned earlier, in case of using the PUCCH channel structure of the block spreading scheme, it enables to transmit control information of an extended size compared to a legacy PDCCH format 1 series and 2 series.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 11:
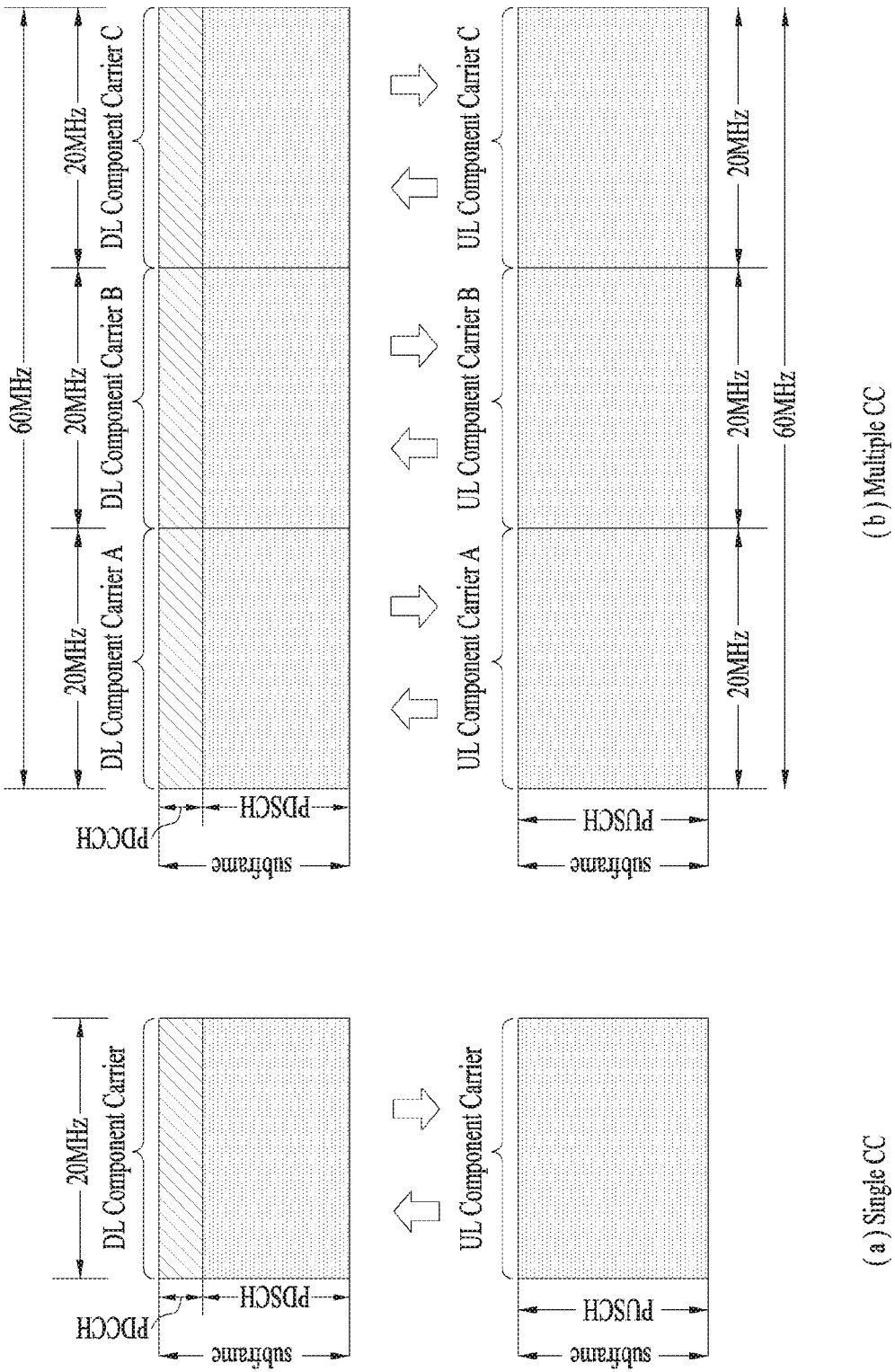
FIG. 11 is a view illustrating exemplary Component Carriers (CCs) and Carrier Aggregation (CA) in a Long Term Evolution-Advanced (LTE-A) system.

FIG. 11 illustrates an example of CCs and CA in the LTE-A system, which are used in embodiments of the present disclosure.

FIG. 11(a) illustrates a single carrier structure in the LTE system. There are a DL CC and a UL CC and one CC may have a frequency range of 20 MHz.

FIG. 11(b) illustrates a CA structure in the LTE-A system. In the illustrated case of FIG. 11(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 12:
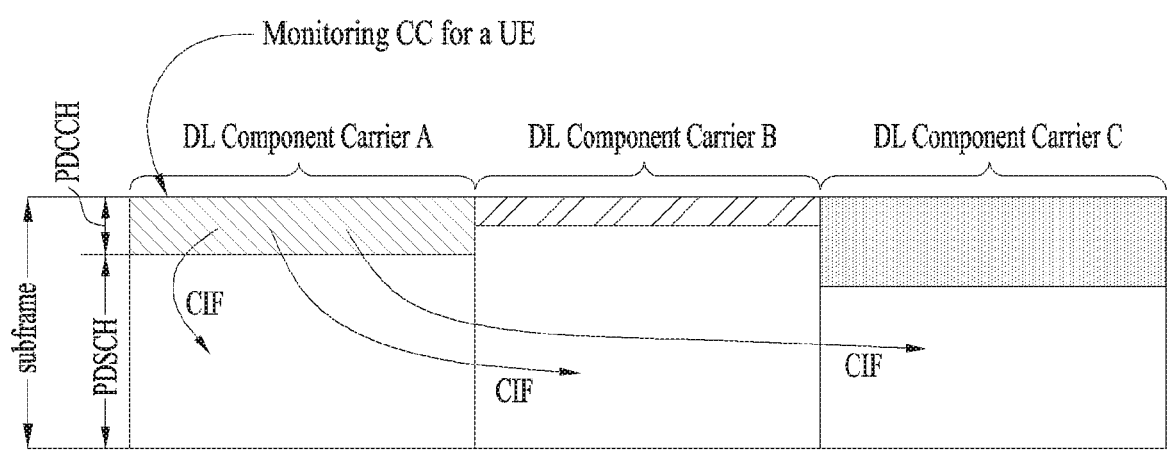
FIG. 12 is a view illustrating a subframe structure based on cross-carrier scheduling in the LTE-A system.

FIG. 12 illustrates a cross carrier-scheduled subframe structure in the LTE-A system, which is used in embodiments of the present disclosure.

Referring to FIG. 12, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 13:
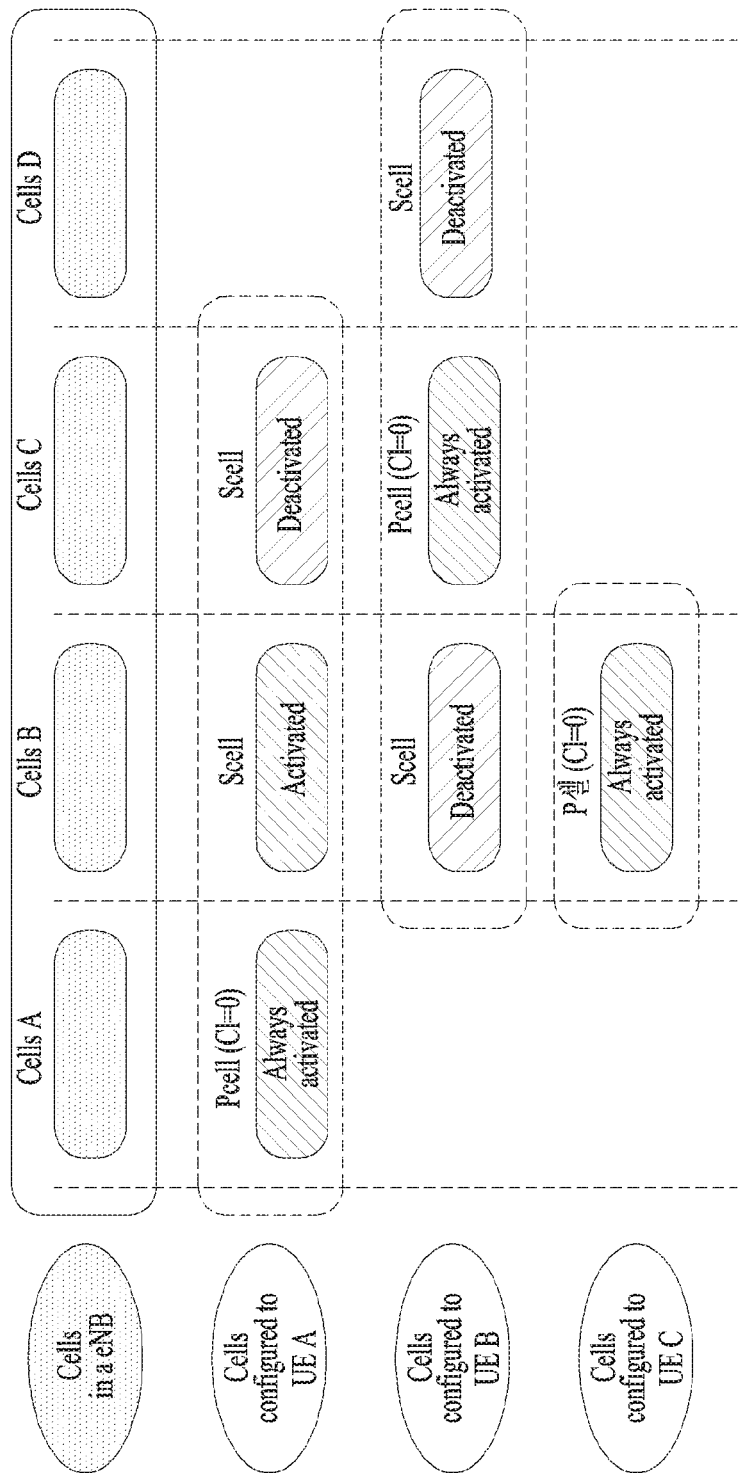
FIG. 13 is a view illustrating an exemplary serving cell configuration based on cross-carrier scheduling.

FIG. 13 is a view illustrating an exemplary serving cell configuration based on cross-carrier scheduling.

Referring to FIG. 13, an eNB (or BS) and/or UEs for use in a radio access system supporting CA may include one or more serving cells. In FIG. 13, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of PCell. In this case, PCell is always activated, and SCell may be activated or deactivated by the eNB and/or UE.

The cells shown in FIG. 13 may be configured per UE. The above-mentioned cells selected from among cells of the eNB, cell addition may be applied to CA on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and SRS transmission. The deactivated cell is configured not to transmit/receive PDSCH/PUSCH signals by an eNB command or a timer operation, and Common Reference Signal (CRS) reporting and SRS transmission are interrupted.

2.3 CA Environment-Based CoMP Operation

Hereinafter, a Coordinated Multi-Point (CoMP) transmission operation applicable to the embodiments of the present disclosure will be described.

In the LTE-A system, CoMP transmission may be implemented using a CA function in the LTE.

It is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as Joint Transmission (JT), CS/CB and dynamic cell selection for one UE.

Cells managed by two eNBs may be aggregated as a PCell and an SCell for one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

2.4 Reference Signal (RS)

Now, a description will be given of RSs which may be used in embodiments of the present disclosure.

UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

Figure 15:
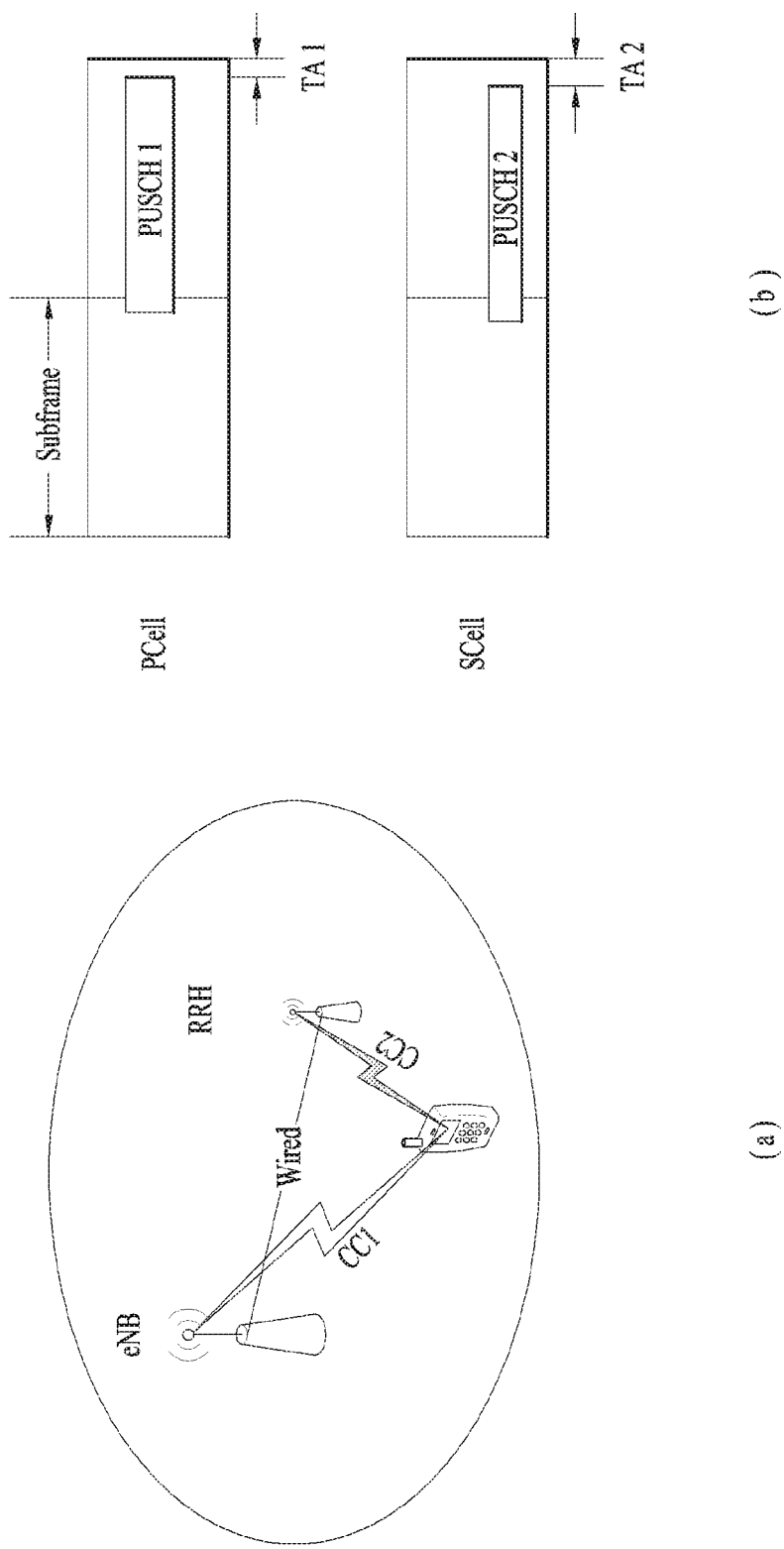
FIG. 15 is a view illustrating exemplary aggregation of a plurality of cells having different frequency characteristics.

In the 3GPP LTE-A system, the UE-RSs are defined in a PRB pair. Referring to FIG. 15, in a PRB having frequency-domain index nPRB assigned for PDSCH transmission with respect to p=7, p=8, or p=7, 8, . . . , υ+6, a part of UE-RS sequence r(m) is mapped to complex-valued modulation symbols.

UE-RSs are transmitted through antenna port(s) corresponding respectively to layer(s) of a PDSCH. That is, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a RB pair are the same with respect to a UE-RS port regardless of a UE or a cell.

As a result, the number of DM-RS REs in an RB to which a PDSCH for a specific UE in a specific subframe is mapped is the same per UE-RS ports. Notably, in RBs to which the PDSCH for different UEs in the same subframe is allocated, the number of DM-RS REs included in the RBs may differ according to the number of transmitted layers.

The UE-RS can be used as the DM-RS in the embodiments of the present disclosure.

Sounding Reference Signal (SRS)

A sounding reference signal (SRS) is mainly used for an eNode B to perform a frequency-selective scheduling in UL in a manner of measuring a channel quality and the SRS is not related to a UL data and/or a control information transmission. Yet, this is just exemplary. The SRS can also be used to enhance power control or to support various start-up functions of UEs, which are not recently scheduled. For instance, the start-up function may include an initial modulation and coding scheme (MCS), an initial power control to transmit a data, timing alignment, frequency-semi selective scheduling (a frequency resource is selectively allocated in a first slot in a subframe and a frequency resource is pseudo-randomly hopped to a different frequency in a second slot), and the like.

And, the SRS can be used for a channel quality measurement under an assumption that a radio channel is reciprocal between UL and DL. The assumption is specifically effective in a time division duplex (TDD) system that the UL and the DL share an identical frequency band and are distinguished from each other in time domain.

A subframe to which an SRS is transmitted by a random UE in a cell is indicated by a cell-specific broadcast signaling. A cell-specific parameter of 4-bit 'SrsSubframeConfiguration' indicates 15 available configurations of a subframe to which an SRS is capable of being transmitted in each radio frame. By the help of the configurations, flexibility capable of controlling an SRS overhead can be provided according to a network arrangement scenario. The configuration of a last one ($16^{th}$) of the parameter corresponds to completely switching-off of an SRS transmission in a cell. For instance, the switching-off configuration may be suitable for a cell for serving a fast UEs.

An SRS is always transmitted in a last SC-FDMA symbol of a configured subframe. Hence, the SRS and a demodulation reference signal (DMRS) are positioned at a SC-FDMA symbol different from each other. PUSCH data transmission is not allowed in the SC-FDMA symbol designated to transmit an SRS. Hence, in case that a sounding overhead is severest (i.e., in case that the SRS transmission symbol exists in all subframes), the sounding overhead is not over about 7%.

Each of the SRS symbols is generated by a base sequence (a random sequence or a ZC (Zadoff-Chu)-based sequence set) in a given time unit and a frequency band and all UEs in a cell use an identical base sequence. In this case, SRS transmissions from a plurality of UEs in a cell in an identical time unit and an identical frequency band are orthogonally distinguished by a different cyclic shift of the base sequence assigned to a plurality of the UEs. An SRS sequence of a different cell can be distinguished by assigning a different base sequence to each cell. Yet, orthogonality between different base sequences is not secured.

2.5 Enhanced PDCCH (EPDCCH)

In the 3GPP LTE/LTE-A system, Cross-Carrier Scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a search space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figures 17, 18:
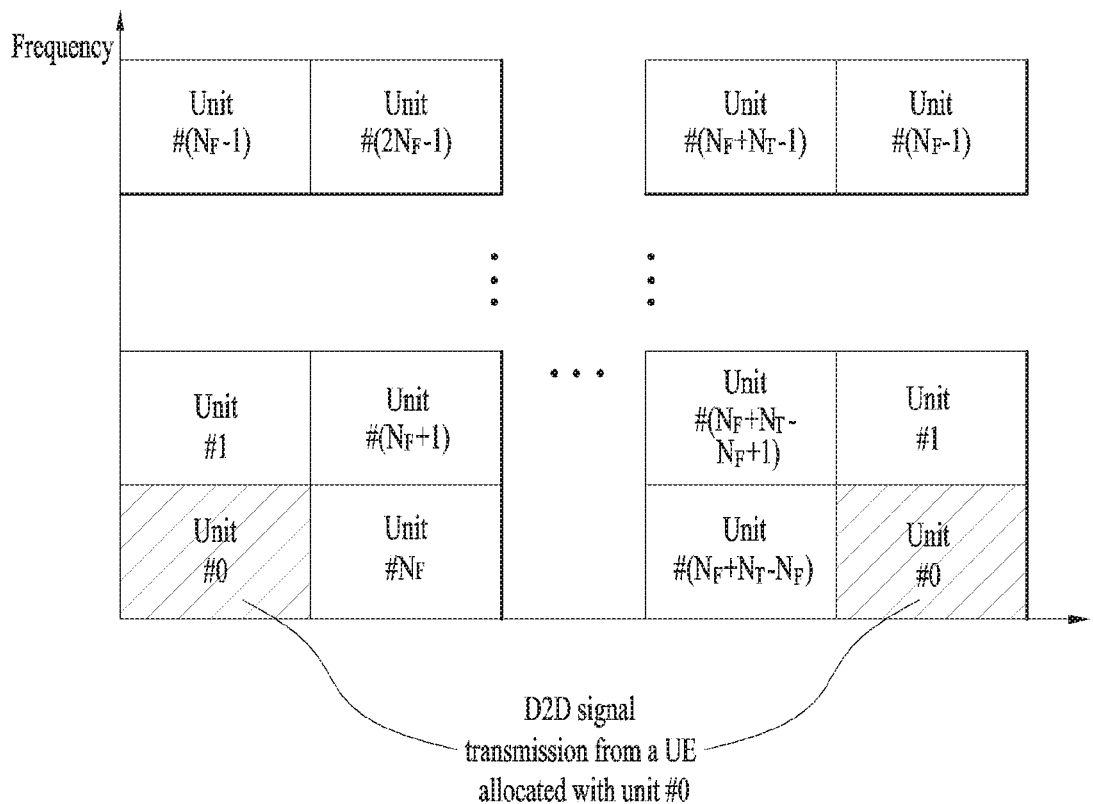
FIG. 17 is a view illustrating an exemplary Resource Unit (RU) configuration applicable to the present disclosure.
FIG. 18 is a view illustrating an exemplary resource structure for a sidelink.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of Frequency Division Multiplexing/Time Division Multiplexing (FDM/TDM) may be introduced instead of a control channel such as PDCCH, which is transmitted through OFDM symbol and separated from PDSCH. FIG. 17 illustrates an example that legacy PDCCH, PDSCH and E-PDCCH, which are used in an LTE/LTE-A system, are multiplexed.

In the aforementioned system to which carrier aggregation is applied, a UE can receive a plurality of PDSCHs via a plurality of downlink carriers. In this case, the UE may transmit ACK/NACK for each data on a single UL CC in a single subframe. In case of transmitting a plurality of ACKs/NACKs in a single subframe using a PUCCH format 1a/1b, high transmit power is required, PAPR of uplink transmission increases, and a transmit power amplifier can be inefficiently used. As a result, a transmission distance from an eNB can be decreased. In order to transmit a plurality of the ACKs/NACKs via a single PUCCH, it may apply ACK/NACK bundling or ACK/NACK multiplexing.

And, ACK/NACK information on a plurality of downlink data according to the application of the carrier aggregation and/or ACK/NACK information on a plurality of downlink data transmitted in a plurality of DL subframes in a TDD system can be transmitted via PUCCH in a single subframe. In this case, if the number of ACK/NACK bits to be transmitted is greater than the number of ACK/NACK bits capable of being supported by ACK/NACK bundling or ACK/NACK multiplexing, it is difficult to properly transmit ACK/NACK information using the aforementioned methods.

ACK/NACK Multiplexing Scheme

In case of ACK/NACK multiplexing, ACK/NACK response contents on a plurality of data units can be identified by a combination of an ACK/NACK unit used for practically transmitting an ACK/NACK and symbols modulated by QPSK scheme. For instance, assume that one ACK/NACK unit carries information of 2-bit long and receives maximum 2 data units. In this case, assume that HARQ confirmation response for each of the received data units is represented by one ACK/NACK bit. In this case, a transmitting end, which has transmitted a data, can identify an ACK/NACK result as shown in a following Table 10.

TABLE 10

| HARQ-ACK(0), HARQ-ACK(0) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

Referring to Table 10, HARQ-ACK(i) (i=0, 1) indicates the ACK/NACK result for a data unit i. As mentioned earlier, since it is assumed that the maximum 2 data units (data unit 0 and data unit 1) are received, ACK/NACK result for the data unit 0 is represented as HARQ-ACK(0) and the ACK/NACK result for the data unit 1 is represented as HARQ-ACK(1) in the Table 6. In the Table 6, discontinuous transmission (DTX) indicates that a data unit corresponding to the HARQ-ACK(i) is not transmitted or a receiving end cannot detect a presence of a data unit corresponding to the HARQ-ACK(i). And, $n_{PUCCH,x}^{(1)}$ indicates an ACK/NACK unit practically used for an ACK/NACK transmission. In case that maximum 2 ACK/NACK units exist, the ACK/NACK unit can be represented as $n_{PUCCH,0}^{(1)}$ and $n_{PUCCH,1}^{(1)}$. And, b(0) and b(1) indicate two bits transmitted by a selected ACK/NACK unit. A modulation symbol transmitted by the ACK/NACK unit is determined according to the b(0) and the b(1) bit.

For instance, in case that a receiving end successfully receives and decodes 2 data units (i.e., in case of ACK, ACK in the Table 6), the receiving end transmits two bits (1, 1) using the ACK/NACK unit $n_{PUCCH,1}^{(1)}$. Or, in case that the receiving end receives 2 data units, if the receiving end fails to decode (detect) a first data unit (i.e., data unit 0 corresponding to HARQ(0)) and successfully decodes a second data unit (i.e., data unit 1 corresponding to HARQ-ACK(1)) (i.e., in case of NACK/DTX, ACK in the Table 6), the receiving end transmits 2 bits (0, 0) using the ACK/NACK unit $n_{PUCCH,1}^{(1)}$.

As mentioned in the foregoing description, the ACK/NACK information on a plurality of the data unit can be transmitted using one ACK/NACK unit in a manner of linking or mapping a combination (i.e., combination of selecting either $n_{PUCCH,0}^{(1)}$ or $n_{PUCCH,1}^{(1)}$ and b(0), b(1)) of a selection of the ACK/NACK unit and an actual bit content of a transmitted ACK/NACK unit to actual ACK/NACK contents. The ACK/NACK multiplexing for the data unit greater than 2 can be easily implemented by extending a principle of the aforementioned ACK/NACK multiplexing.

In the aforementioned ACK/NACK multiplexing scheme, if at least one ACK basically exists for all data units, an NACK may be not distinguished from a DTX (in particular, as represented as NACK/DTX in Table 6, the NACK and the DTX can be coupled). It is because all ACK/NACK states (i.e. ACK/NACK hypotheses) capable of being occurred in case of separately representing the NACK and the DTX cannot be reflected by a combination of the ACK/NACK unit and the symbol modulated by QPSK scheme only. Meanwhile, if the ACK does not exist for all data units (i.e., if the NACK or the DTX exists for all data units), a definite NACK for indicating one definite NACK (i.e., an NACK distinguished from a DTX) can be defined among the HARQ-ACK(i). In this case, an ACK/NACK unit corresponding to a data unit for indicating the definite NACK can be reserved to transmit signals of a plurality of ACK/NACK.

Semi-Persistent Scheduling (SPS)

DL/UL SPS (semi-persistent scheduling) designates a UE that which subframes (subframe interval and offset) are in charge of SPS transmission/reception by an RRC (radio resource control) signaling first, and then performs actual activation and release of the SPS via PDCCH. In particular, although the UE receives the SPS by the RRC signaling, if the UE receives (i.e., receiving PDCCH of which an SPS C-RNTI is detected) PDCCH for informing of activation (or reactivation), the UE does not immediately perform an SPS TX/RX but perform an SPS operation according to the PDCCH.

In particular, if the UE receives an SRS activation PDCCH, the UE allocates a frequency resource according to an RB assignment designated by the PDCCH, applies a modulation and a coding rate according to MCS information, and may begin to perform the TX/RX with the subframe interval and offset assigned by the RRC signaling. Meanwhile, if the UE receives PDCCH for informing of an SRS release, the UE stops the TX/RX. If the PDCCH for informing of activation (or reactivation) is received, the stopped SPS TX/RX can resume the TX/RX with the subframe and the offset assigned by the RRC signaling according to the RB assignment, MCS, and the like designated by the PDCCH.

The PDCCH format currently defined by 3GPP LTE includes such various formats as a DCI format 0 for an UL and DCI format 1, 1A, 1B, 1C, 1D, 2, 2A, 3, 3A, and the like for a DL. Such a control information as a hopping flag, RB allocation, an MCS (modulation coding scheme), an RV (redundancy version), an NDI (new data indicator), a TPC (transmit power control), a cyclic shift DMRS (demodulation reference signal), a UL index, a CQI (channel quality information) request, a DL assignment index, a HARQ process number, a TPMI (transmitted precoding matrix indicator), a PMI (precoding matrix indicator) confirmation, and the like is transmitted in a form of a combination of being selected in accordance with each usage.

More specifically, using a PDCCH as a usage of SPS scheduling activation/release can be validated in case that a CRS of a DCI transmitted on the PDCCH is masked with an SPS C-RNTI and an NDI is set to 0. In this case, in case of SPS activation, a virtual CRC is used in a manner of setting a combination of a bit field to 0 as depicted in Table 11.

TABLE 10

| | DCI format 0 | DCI format 1/1A | DCI format 2/2A/2B |
|---|---|---|---|
| TPC command for scheduled PUSCH | set to '00' | N/A | N/A |
| Cyclic shift DMRS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: MSB is set to '00' |

When an error not capable of being checked by a CRC occurs, the virtual CRC is configured to have an ability of additional error detection in a manner of checking whether a corresponding bit field value is a promised value. When an error occurs a DCI assigned to a different UE, if a specific UE cannot detect the corresponding error and the UE incorrectly recognizes the error as an SPS activation of the UE, since the UE continuously uses a corresponding resource, one time error may cause a consistent problem. Hence, a wrong detection of an SRS can be avoided by the use of the virtual CRC.

In case of an SRS release, the virtual CRC can be used by setting a bit field value as depicted in Table 12.

TABLE 12

| | DCI format 0 | DCI format 1A |
|---|---|---|
| TPC command for scheduled PUSCH | set to '00' | N/A |
| Cyclic shift DMRS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | set to all '1's |

3. Transmission Timing Adjustments

In the LTE system, the amount of time that a signal transmitted from a UE takes to reach an eNB may vary depending on a radius of a cell, a location of the UE in a cell, mobility of the UE, and the like. That is, unless the eNB controls a UL transmission timing of each UE, interference may occur between UEs while each UE communicates with the eNB. Moreover, this may increase an error occurrence rate of the eNB. The amount of time that the signal transmitted from the UE takes to reach the eNB may be referred to as a Timing Advance (TA). Assuming that a UE is randomly located randomly in a cell, the TA from the UE to the eNB may vary depending on a location of the UE. For instance, if the UE is located at the boundary of the cell instead of at the center of the cell, the TA of the UE may be increased. In addition, the TA may vary depending on a frequency band of the cell. Thus, the eNB needs to be able to manage or adjust transmission timings of UEs in the cell to prevent the interference between UEs. The management or adjustment of transmission timings, which is performed by the eNB, may be referred to as TA maintenance or time alignment.

The TA maintenance or time alignment may be performed in a random access procedure. During the random access procedure, an eNB may receive a random access preamble from a UE and then calculate a TA value using the received random access preamble. The UE may receive the calculated TA value through a random access response and then update a signal transmission timing based on the received TA value. Alternatively, after receiving an uplink reference signal (e.g., SRS) that is transmitted periodically or aperiodically from the UE, the eNB may calculate the TA. Thereafter, the UE may update the signal transmission timing based on the calculated TA value.

As described above, the eNB may measure UE's TA through the random access preamble or the uplink reference signal and then inform the UE of an adjustment value for the time alignment. Here, the adjustment value for time alignment may be referred to as a Timing Advance Command (TAC). The TAC may be processed by a MAC layer. If a UE receives the TAC from the eNB, the UE assumes that the received TAC is valid only for a prescribed time. A Time Alignment Timer (TAT) may be used for indicating the prescribed time. A TAT value may be transmitted to the UE through higher layer signaling (e.g., RRC signaling).

A UE may start transmission of uplink radio frame #i $(N_{TA}+N_{TAoffset})\times T_s$ seconds before the start of a corresponding downlink radio frame, where $0 \leq N_{TA} \leq 20512$, $N_{TAoffset}=0$ in case of a FDD frame structure, and $N_{TAoffset}=624$ in case of a TDD frame structure. $N_{TA}$ may be indicated by the TAC and $T_s$ represents a sampling time. The UL transmission timing may be adjusted in unit of a multiple of $16T_s$. The TAC may be given as 11 bits in the random access response and it may indicate a value of 0 to 1282. In addition, $N_{TA}$ may be given TA*16. Alternatively, the TAC may be given as 6 bits and it may indicate a value of 0 to 63. In this case, $N_{TA}$ is given as $N_{TA,old}+(TA-31)*16$. The TAC received in subframe n may be applied starting from subframe n+6.

3.1. Timing Advance Group (TAG)

In case that a UE use a plurality of serving cells, there may be serving cells having similar TA characteristics. For example, serving cells having similar frequency characteristics (e.g. frequency bands) or similar propagation delays may have similar TA characteristics. Thus, when carrier aggregation is performed, serving cells having similar TA characteristics may be managed as a group to optimize signaling overhead caused by synchronization adjustment of a plurality of uplink timings. Such a group may be referred to as a TAG. Serving cell(s) having similar TA characteristics may belong to one TAG and at least one serving cell(s) in the TAG must have uplink resources. For each serving cell, an eNB may inform a UE of TAG allocation using a TAG identifier through higher layer signaling (e.g. RRC signaling). Two or more TAGs may be configured for one UE. If a TAG identifier indicates 0, this may mean a TAG including a PCell. For convenience, the TAG including the PCell may be referred to as a primary TAG (pTAG) and TAG(s) other than the pTAG may be referred to as a secondary TAG (sTAG or secTAG). A secondary TAG identifier (sTAG ID) may be used to indicate an sTAG corresponding to an SCell. If an sTAG ID is not configured for an SCell, the SCell may be configured as a part of pTAG. One TA may be commonly applied to all CCs included in one TA group.

Hereinafter, a description will be given of a structure of TAC MAC CE for transmitting the TAC to a UE.

3.2. Timing Advance Command MAC CE (TAC MAC CE)

In the 3GPP LTE system, Medium Access Control (MAC) Protocol Data Unit (PDU) includes a MAC header, a MAC Control Element (CE), and at least one MAC Service Data Unit (SDU). The MAC header includes at least one sub-header. Each sub-header corresponds to the MAC CE and MAC SDU. The sub-header is used to represent lengths and properties of the MAC CE and MAC SDU.

The MAC SDU is a data block provided from a higher layer (e.g., an RLC layer or an RRC layer) of a MAC layer. The MAC CE is used to deliver control information of the MAC layer such as a buffer status report.

The MAC sub-header includes the following fields

R (1 bit): A reserved field.

E (1 bit): An extended field. It indicates whether there are F and L fields in a next field.

LCID (5 bit): A logical channel ID field. It indicates a type of the MAC CE or a specific logical channel to which the MAC SDU belongs.

F (1 bit): A format field. It indicates whether a next L field has a size of 7 bits or 15 bits.

L (7 or 15 bit): A length field. It indicates a length of the MAC CE or MAC SDU corresponding to the MAC sub-header.

The F and L fields are not included in a MAC sub-header corresponding to a fixed-sized MAC CE.

Figure 14:
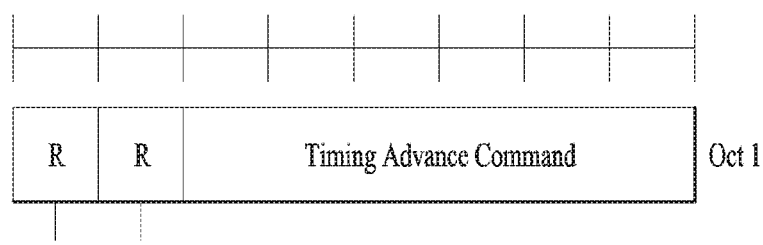
FIG. 14 is a view illustrating a structure of a Timing Advance Command (TAC) Medium Access Control (MAC) Control Element (CE)

FIG. 14 illustrates a TAC MAC CE as a fixed-sized MAC CE. TAC is used for controlling the amount of time adjustment to be applied to a UE and it is identified by the LCID of the MAC PDU sub-header. Here, the MAC CE has a fixed size and it is configured with a single octet as shown in FIG. 10.

R (1 bit): A reserved field.

TAC (timing advance command) (6 bits): It indicates a TA index value (e.g., 0, 1, 2, . . . , 63) used for controlling the amount of time adjustment to be applied to a UE.

Although the adjustment value for the time alignment may be transmitted through the TAC, it may be transmitted through a random access response (hereinafter abbreviated as RAR) in response to a random access preamble transmitted from a UE for initial access.

3.3. A Case of Having a Plurality of TAs

FIG. 15 illustrates exemplary aggregation of a plurality of cells having different frequency characteristics. The LTE-A system allows a UE to aggregate a plurality of cells belonging to different frequency bands (i.e., separated far from each other in the frequency domain), a plurality of cells with different propagation characteristics, or a plurality of cells having different coverage. Moreover, in case of a specific cell, it may be considered that Remote Radio Heads (RRHs)

such as repeaters are deployed within the cell for the purpose of coverage expansion or coverage hole elimination. For instance, inter-site carrier aggregation may be performed between cells formed in different locations. Here, the RRH can be referred to as a Remote Radio Unit (RRU). The eNB and RRH (or RRU) can be referred to as a node or a transmitting node.

For instance, referring to FIG. 15(a), a UE aggregates two cells (i.e., cell 1 and cell 2). The cell 1 (or cc 1) may be formed to perform direct communication with an eNB without the RRH and the cell 2 may be formed to use the RRH due to limited coverage. In this case, a propagation delay (or eNB's reception timing) of a UL signal transmitted from a UE through the cell 2 (or CC 2) may be different from a propagation delay (or eNB's reception timing) of a UL signal transmitted through the cell 1 due to a location of the UE, frequency characteristics, etc. When a plurality of cells have different propagation delay characteristics as described above, multiple TAs are inevitable.

FIG. 15(b) illustrates a plurality of cells with different TAs. Referring to FIG. 11(b), a UE aggregates two cells (e.g., PCell and SCell). The UE may transmit a UL signal (PUSCH) by applying different TA to each of the two cells.

4. Device-to-Device (D2D) Communication

Hereinafter, a D2D communication environment applicable to the present invention will briefly be described.

The D2D communication refers to communication between an electronic device and another electronic device. In a broad sense, the D2D communication refers to wire or wireless communication between electronic devices or communication between a machine and a device controlled by a user. Recently, the D2D communication may generally mean wireless communication between electronic devices operating without human involvement.

Figure 16:
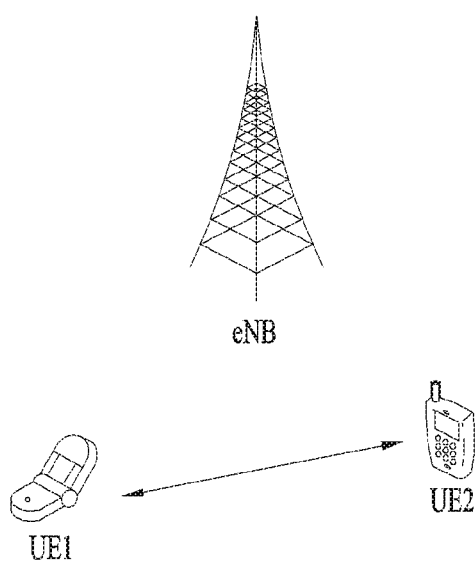
FIG. 16 is a view illustrating a communication system applicable to the present disclosure.

FIG. 16 is a conceptual diagram for explaining D2D communication. In FIG. 12, a device-to-device or UE-to-UE communication scheme is illustrated as an example of the D2D communication. According to this scheme, data can be exchanged between UEs without intervention of an eNB. A direct link established between devices can be referred to as a D2D link. Compared to the conventional eNB-based communication, the D2D communication has advantages in that latency is reduced and the amount of required resources is small. Here, the UE means a terminal of a user. However, if a network equipment such as an eNB transmits and receives signals according to the communication scheme between UEs, the network equipment can also be considered as the UE.

For D2D communication, time synchronization and frequency synchronization should be acquired between two UEs. In general, if the two UEs are located within the coverage of an eNB, the UEs are synchronized to a PSS/SSS or CRS transmitted by the eNB, and the time/frequency synchronization may be maintained at a level that enables direct signal transmission and reception between the two UEs. Herein, a synchronization signal for D2D communication will be referred to as a D2DSS. The D2DSS may include synchronization signals such as the PSS/SSS of the LTE system. A PSS/SSS transmitted for D2D communication is referred to as a Primary D2D Synchronization Signal (PD2DSS)/Secondary D2D Synchronization Signal (SD2DSS), or a Primary Sidelink Synchronization Signal (PSSS)/Secondary Sidelink Synchronization Signal (SSSS). Like the PSS of the LTE system, the PSSS may be used to acquire a coarse timing, and may be based on a ZC sequence. Like the SSS of the LTE system, the SSSS may be used for fine synchronization, and may be based on an m-sequence. A Physical D2DSS (PD2DSCH or Physical Sidelink Broadcast Channel (PSBCH)) refers to a physical channel carrying required information for synchronization, such as a system bandwidth and the indexes of a radio frame and a subframe.

Meanwhile, D2D signals transmitted via a sidelink may be classified largely into discovery and communication signals. The discovery signal may be represented as a message including the ID of a transmitting UE or the like. Since discovery of a UE by the discovery signal tolerates a long time delay, resources for transmission of the discovery signal may have a relatively long periodicity. On the other hand, the communication signal delivers general data (e.g., voice or video information) that a UE wants to transmit. Since the data should be completely transmitted for a short time, resources for transmission of the communication signal may have a relatively short periodicity.

More specifically, the discovery signal is used for one UE to identify a plurality of adjacent UEs. An example of a sidelink channel for transmission and reception of the discovery signal is a Physical Sidelink Discovery Channel (PSDCH). The communication signal delivers general data (e.g., voice or video information) that a UE wants to transmit. Examples of a sidelink channel for transmission and reception of the communication signal include a Physical Sidelink Broadcast Channel (PSBCH), a Physical Sidelink Shared Channel (PSSCH), and a Physical Sidelink Control Channel (PSCCH).

4.1 Sidelink Resources

A sidelink radio frame includes 10 subframes, each subframe including two slots in the time domain. One slot includes a plurality of SC-FDMA symbols in the time domain and a plurality of RBs in the frequency domain. Since SC-FDMA is used for a sidelink in the 3GPP LTE system, an SC-FDMA symbol represents one symbol period. An RB as a resource allocation unit may include a plurality of contiguous subcarriers in one slot. The last SC-FDMA symbol of a sidelink subframe may be set as a Guard Period (GP), and may not be used for sidelink transmission.

A sidelink CP may be configured individually for a discovery signal, a sidelink control signal, a sidelink data signal, a broadcast signal, and a synchronization signal. The configuration may be set for each resource pool for a discovery signal, a control signal, and so on. A broadcast signal and a synchronization signal may use the same CP. Now, a description will be given of a resource grid for a sidelink slot.

A sidelink slot includes $N^{SL}_{symb}$ SC-FDMA symbols in the time domain and $N^{SL}_{RB}$ RBs in the frequency domain. Since each RB includes $N^{RB}_{SC}$ subcarriers, a DL slot includes $N^{SL}_{RB} \times N^{RB}_{SC}$ subcarriers in the frequency domain. Each element in a resource grid is called an RE, and one RE is indicated by the index of one SC-FDMA symbol and the index of one subcarrier. One RB includes $N^{SL}_{symb} \times N^{RB}_{SC}$ REs. A sidelink bandwidth $N^{SL}_{RB}$ may be equal to the number of RBs $N^{UL}_{RB}$ of a UL slot, set by a cell, or may be a predetermined value.

4.2 Sidelink Resource Pool

A resource pool may be defined as a set of specific resources for a sidelink operation. A UE may transmit and receive signals by selecting resources in a related resource pool. A different sidelink resource pool may be defined according to the type of a transmission signal.

In FIG. 16, UE1 may select a Resource Unit (RU) corresponding to specific resources in a resource pool being a set of resources, and transmit a D2D signal in the selected RU. The resource pool in which UE1 may transmit a signal is configured for a receiving UE, UE2, and UE2 detects the signal of UE1 in the resource pool.

If UE1 is located within the coverage of an eNB, the eNB may indicate the resource pool to UE1 by configuration information. If UE1 is located outside the coverage of the eNB, another UE may indicate the resource pool to UE1, or the resource pool may be determined to be preset resources. In general, a resource pool includes a plurality of RUs, and each UE may select one or more RUs and use the selected RU(s) in transmitting and receiving its D2D signal.

FIG. 17 illustrates an exemplary RU configuration. A total of $N_F \times N_T$ RUs are defined by dividing total frequency resources by $N_F$ and dividing total time resources by $N_T$. Herein, it may be said that a corresponding resource pool is repeated every $N_T$ subframes. One RU may be periodically repeated, as illustrated in FIG. 17.

Or to achieve time diversity or frequency diversity, the index of a Physical RU (PRU) to which a Logical RU (LRU) is mapped may be changed over time in a predetermined pattern. In this RU structure, a resource pool may mean a set of RUs available for transmission or reception of a UE that intends to transmit a D2D signal.

A subframe pool and an RB pool may be defined as resource pools. In the illustrated case of FIG. 17, the total $N_T$ time resources may correspond to a subframe pool in the time domain, and the total $N_F$ time resources may correspond to an RB pool in the frequency domain.

The above-described resource pools may be classified into a plurality of types. First, the resource pools may be classified according to the content of a D2D signal transmitted in each resource pool. For example, the content of D2D signals may be categorized into PSCCH, PSDCH, and PSSCH, and a resource pool may be configured separately for each of the PSCCH, the PSDCH, and the PSSCH.

The PSCCH is a control channel carrying a signal including information about the positions of resources that each transmitting UE uses for transmission of a subsequent PSDCH, and information required for demodulation of the data channel such as a Modulation and Coding Scheme (MCS) or a MIMO transmission scheme. The PSCCH may also be called a Scheduling Assignment (SA). Control information transmitted on the PSCCH is referred to as Sidelink Control Information (SCI). Specifically, SCI includes sidelink RB allocation information or time resource pattern information. It is possible to transmit a sidelink control signal multiplexed with sidelink data in the same RU. In this case, an SA resource pool or a PSCCH resource pool may refer to a resource pool in which an SA is transmitted multiplexed with sidelink data.

The PSSCH is a channel on which the transmitting UE transmits user data in resources indicated by the SA or the PSCCH. A resource pool configured for the PSSCH is referred to as a PSSCH resource pool. If it is also possible to transmit an SA multiplexed with sidelink data in the same RU, only a data channel except for SA information may be transmitted in the PSSCH resource pool. For example, an RE used for transmission of SA information in an individual RU of an SA resource pool is still used for transmission of sidelink data in the PSSCH resource pool.

The PSDCH is a channel on which the transmitting UE transmits a message including information such as its ID so that an adjacent UE may discover the transmitting UE. A resource pool for the PSDCH is referred to as a PSDCH resource pool.

Even though the above-described D2D signals have the same content, they may use different resource pools according to the transmission and reception properties of the D2D signals. For example, even though D2D signals are the same PSSCH or PSDCH, different resource pools may be configured for the D2D signals according to the transmission timing determination schemes, resource allocation schemes, or signal formats of the D2D signals.

For example, different resource pools may be configured depending on whether D2D signals are transmitted at a reception time of a reference synchronization signal or with a predetermined TA. Further, for example, different resource pools may be configured depending on whether an eNB indicates transmission resources for an individual signal to an individual transmitting UE or the individual transmitting UE autonomously selects transmission resources for an individual signal in a pool. Further, different resource pools may be configured depending on the signal formats of D2D signals, for example, the number of symbols that each D2D signal occupies in one subframe, or the number of subframes used for transmission of one D2D signal.

A D2D signal may be transmitted in a plurality of subframes, for wider coverage. More specifically, after one D2D message is channel-encoded, it may be transmitted separately in a plurality of subframes. This may be regarded as retransmissions of the D2D message. Each of the subframes carries the same signal. Even in this case, however, scrambling determined by a subframe index may be exceptional. In this case, chase combining may be used, in which the energy of reception signals in the plurality of subframes is combined. Or Incremental Redundancy (IR) may be used, in which a different redundancy version of the same code is transmitted in each subframe, signals received in the subframes are concatenated, and the concatenated signals are considered to be a big codeword, and an original message is recovered by applying the codeword to a single decoder.

Meanwhile, some D2D signals require fast transmission. For example, when a fast moving vehicle transmits an emergency signal indicating breakage to an adjacent vehicle or person, the emergency signal should be transmitted before collision occurs to the vehicle. If this emergency signal is repeated a plurality of times for coverage, its transmission time is increased by as much. Therefore, the original purpose of fast transmission may not be fulfilled.

In this context, the present disclosure proposes a resource configuration method for effectively reducing a transmission delay, even in a situation in which one D2D message is transmitted across a plurality of subframes. For the convenience of description, a set of resources carrying one D2D message is referred as an RU. If one message is transmitted across a plurality of subframes, one RU may be configured with a plurality of subframes. Obviously, one RU may be configured to occupy a part of frequency resources in a resource pool, from the viewpoint of frequency. For a more flexible operation, a D2D message may be transmitted in partial time frequencies and/or partial frequency resources of one RU. In this case, one RU as described below may be interpreted as a resource pool of one period.

Now, a description will be given of the present disclosure, on the assumption that a basic unit of time resources is one subframe. However, embodiments of the present disclosure are also applicable to any other basic unit of time resources. First, the present disclosure proposes that a time spanning from a message generation time to the starting time of an RU, that is, a waiting time until an initial transmission should be reduced by distributing the starting times of RUs.

FIG. 18 is a view illustrating an exemplary resource structure for a sidelink.

FIG. 18 will be described on the assumption that one RU includes four D2D subframes, and for one subframe, frequency resources corresponding to eight RUs are included in a resource pool.

Referring to FIG. 18, RUs located in the same subframe or sharing the same subframe have the same starting time in a legacy simple RU structure. That is, RUs sharing the first to fourth subframes in which Unit #0 is located, Unit #0 to Unit #7 have the same starting time. In this situation, if a message is generated after the starting time of an RU, a UE should pass a repeated time period and wait until the start of the next RU, thereby lengthening a transmission time delay.

Figure 19:
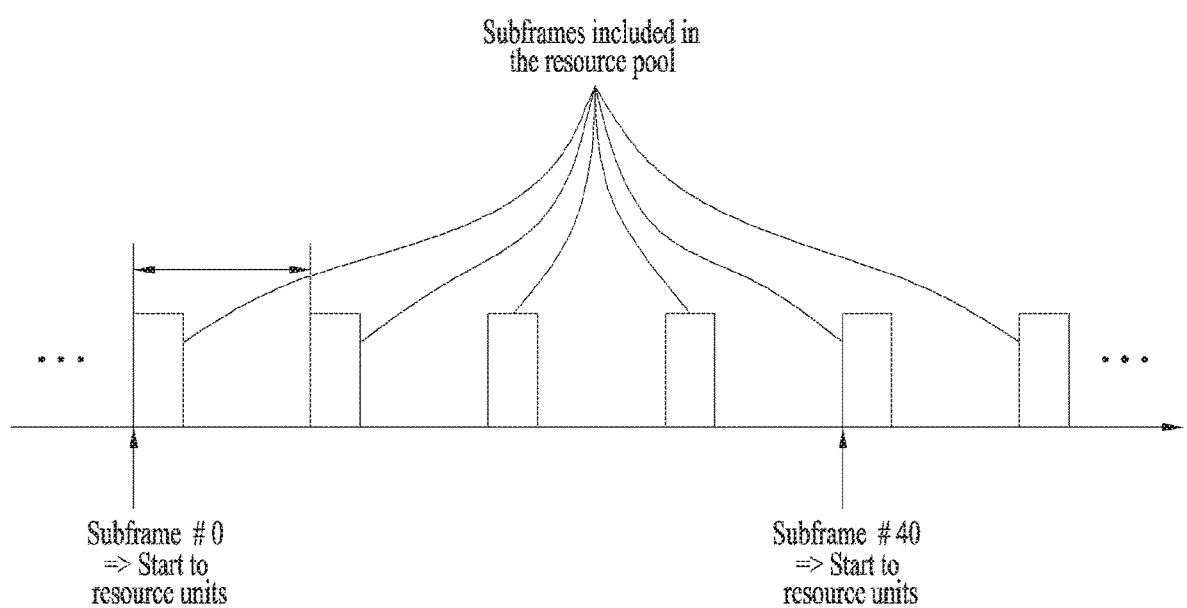
FIG. 19 is a view illustrating an exemplary Device-to-Device (D2D) subframe distribution.

FIG. 19 is a view illustrating an exemplary D2D subframe distribution. In FIG. 19, it is assumed that D2D subframes are apart from each other by 10 ms. In this case, transmission of a new D2D message may start only in subframe #0, #40, #80, . . . in the RU configuration of FIG. 18. More specifically, transmission of RUs Unit #0 to Unit #7 may start in subframe #0 and proceed across subframe #10, subframe #20, and subframe #30. Transmission of a new D2D message may start in the first subframe, subframe #40 after the transmission of the D2D message in the above RUs. Therefore, on the assumption of a uniform message generation and distribution along the time axis, the initial transmission of each message starts in 20 ms on the average and 40 ms at maximum after generation of the message.

Referring to FIGS. 18 and 19, if a message is generated after the starting time of an RU, the message may be transmitted after a repetition time period, for example, 40 ms at maximum, thereby lengthening a transmission time delay, as described above.

Figures 20, 21:
FIG. 20 is a view illustrating exemplary setting of the starting times of RUs according to an embodiment of the present disclosure.
FIG. 21 is a view illustrating an exemplary allocation of control resources according to an embodiment of the present disclosure.

To solve the problem, an embodiment of the present disclosure proposes that the starting times of RUs should be distributed. FIG. 20 is a view illustrating an exemplary distribution of the starting times of RUs according to an embodiment of the present disclosure.

Referring to FIG. 20, while Unit #0 starts at the same time point as in FIG. 18, Unit #1 may start at a time point shifted backward by one D2D subframe, Unit #2 may start at a time point shifted backward by two D2D subframes, and Unit #3 may start at a time point shifted backward by three D2D subframes. That is, a resource structure may be established so that RUs having different frequency areas are misaligned in the time domain. Or RUs sharing the same subframe or the same transmission time unit may be arranged in misalignment in the time domain.

In this structure, even though a message is generated at a specific time, some RUs start soon. Therefore, the message may be transmitted in one of the RUs, thereby reducing its initial transmission time delay. If D2D subframes are allocated in the manner illustrated in FIG. 19 under the RU configuration of FIG. 20, the initial transmission of each message may start in 5 ms on average and 10 ms at maximum after generation of the message.

In a comparison between the structures of FIGS. 18 and 20 in the D2D subframe configuration of FIG. 19, if a message is generated in subframe #2, a time delay of 38 ms takes place because the next first RU starts in subframe #40 in FIG. 18, whereas the time delay is reduced to 8 ms because Unit #1 and Unit #5 start in subframe #10.

Further, if RUs start at different time points during a time period corresponding to one RU as illustrated in FIG. 20, a set of transmitting UEs subjected to FDM is changed in each of the subframes of one RU. Therefore, the resulting change in interference from the transmitting UEs in each subframe leads to interference randomization. While the structures of FIGS. 18 and 20 are based on the assumption that the frequency resources of RUs are fixed in repeated subframes, the RUs may be configured to use frequency resources at different positions in each subframe in order to achieve frequency diversity.

Meanwhile, in the case where a D2D message is too large and thus requires a very large number of subframes, if IR is used, a Redundancy Version (RV) pattern may be repeated a plurality of times.

For example, when one RU includes 8 subframes, subframe #0 to subframe #7, it may be assumed that an RV pattern is repeated in the order of 0, 2, 3, 1 and transmission starts in subframe #0. In this case, a UE may transmit RVs repeatedly in the order of 0, 2, 3, 1, 0, 2, 3, and 1.

For a message generated after subframe #0, its transmission may be allowed to start in the middle in order to reduce a delay to completion of an RU occupying a relatively long time. This is done to allow starting of the message transmission as early as possible, in spite of a small number of transmissions of the message.

A time point at which the initial transmission of a message is allowed may be limited. Specifically, the allowed starting time of a message transmission may be limited to some subframes, not any arbitrary subframe. This is done to reduce the complexity of determining the starting time of a message transmission on the part of a receiving UE, which increases if the message transmission starts at any time. Preferably, it may be restricted that a transmission starts only at the starting time of repetition of one RV pattern. In the above example, the start of a transmission may be limited only to subframe #4 in which RV 0 is transmitted. If this constraint is imposed on the receiving UE, the receiving UE may perform an appropriate reception operation, assuming that each of new UEs starts a transmission only at a specific time point.

Further, a UE that starts transmission or reception in the middle of one unit may be configured to perform energy sensing in a previous subframe of the unit, and only when it turns out from the detected energy being equal to or lower than a predetermined level that no UE has used the unit previously, start the transmission in the middle of the unit. In this case, the energy sensing may be performed based on energy measured in the resources of the unit or the reception power of RSs in the unit.

Now, a description will be given of a method for transmitting control information by a UE in the structure described with reference to FIG. 20. If the UE transmits control information for a D2D message, such as information about time/frequency resources and a Modulation and Coding Scheme (MCS), before transmission of the D2D message, the UE may transmit the control information in part of a time period corresponding to the starting part of a corresponding unit. This is done to receive the following message or data by receiving the control signal.

Further, a D2D message transmitted in one unit may be transmitted in a plurality of Transport Blocks (TBs), not limited to different RVs of a single TB. In this case, the number of TBs transmitted in the unit may be indicated by control information. Or the number of subframes in which one TB is repeatedly transmitted may be indicated by the control information. Since one control signal is transmitted per unit including a plurality of subframes, this structure advantageously enables transmission of a new D2D message starting with transmission of a control signal at an arbitrary time point, while reducing control signal overhead significantly, compared to a structure of transmitting a control signal in each subframe.

Figure 22:
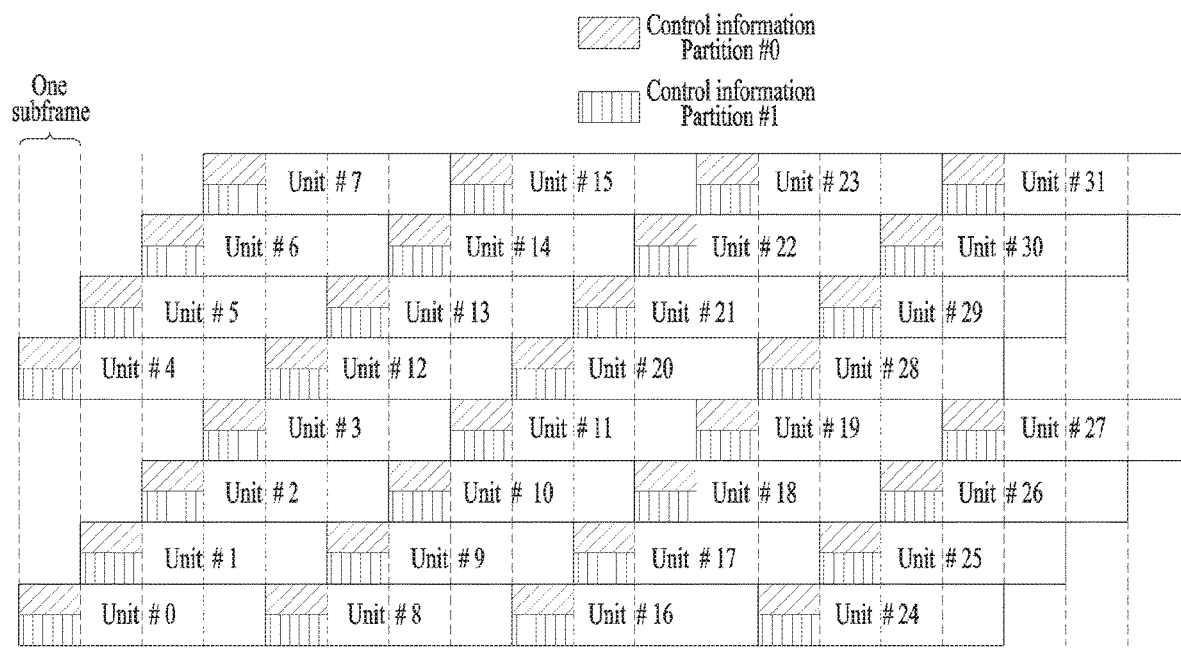
FIG. 22 is a view illustrating another exemplary method for allocating control resources according to an embodiment of the present disclosure.

FIGS. 21 and 22 describe various embodiments of a method for transmitting control information in the resource structure illustrated in FIG. 20.

FIG. 21 illustrates exemplary allocation of a control signal according to an embodiment of the present disclosure. The example corresponds to a case in which the first subframe of each unit is used to transmit a control signal in the structure of FIG. 20. Obviously, the number of subframes in each unit assumed in the embodiment is given for the convenience of description, not limiting the present disclosure. Further, the number of subframes in each unit may be preset, for a more flexible operation.

In addition, a control signal may be transmitted in a plurality of subframes or in a part of the OFDM symbols of one subframe, in each unit. Also, based on the idea that a control channel generally requires less resources than a data channel, a frequency area corresponding to one data unit may be divided into a plurality of partitions, and a control signal may be transmitted in one of the partitions.

In this case, even though the control signal is transmitted in a different partition, it may overlap with data. In this case, the control signal and the data may be distinguished from each other by different sequences in the same resources by determining DM RSs and/or a scrambling sequence used for the data according to the frequency position of the control signal. Obviously, the DM RSs and/or the scrambling sequence used for the data may be indicated by the control channel Since the control channel is the first signal to be decoded, its sequence may be preset.

FIG. 22 illustrates another exemplary method for allocating a control signal according to an embodiment of the present disclosure.

FIG. 22 corresponds to a case in which a control signal region associated with one unit is additionally divided into two frequency areas.

In a modification example of this, partial time resources of a starting part of one unit may be used for both a control signal and data. In this case, the control signal and the data may be transmitted in different frequencies in partial resources of the starting part of the unit. For example, control information may be transmitted in control information partition #0, and data may be transmitted in control information partition #1, in FIG. 22. Or the control information may be embedded in the data, for transmission. This method is effective, particularly when use of one whole subframe is inappropriate due to a small amount of control information.

As described above, as the starting times of a plurality of units are set to be different (within one RU period), the structure of enabling transmission initiation using a unit of a UE at any time may be further extended.

Figure 23:
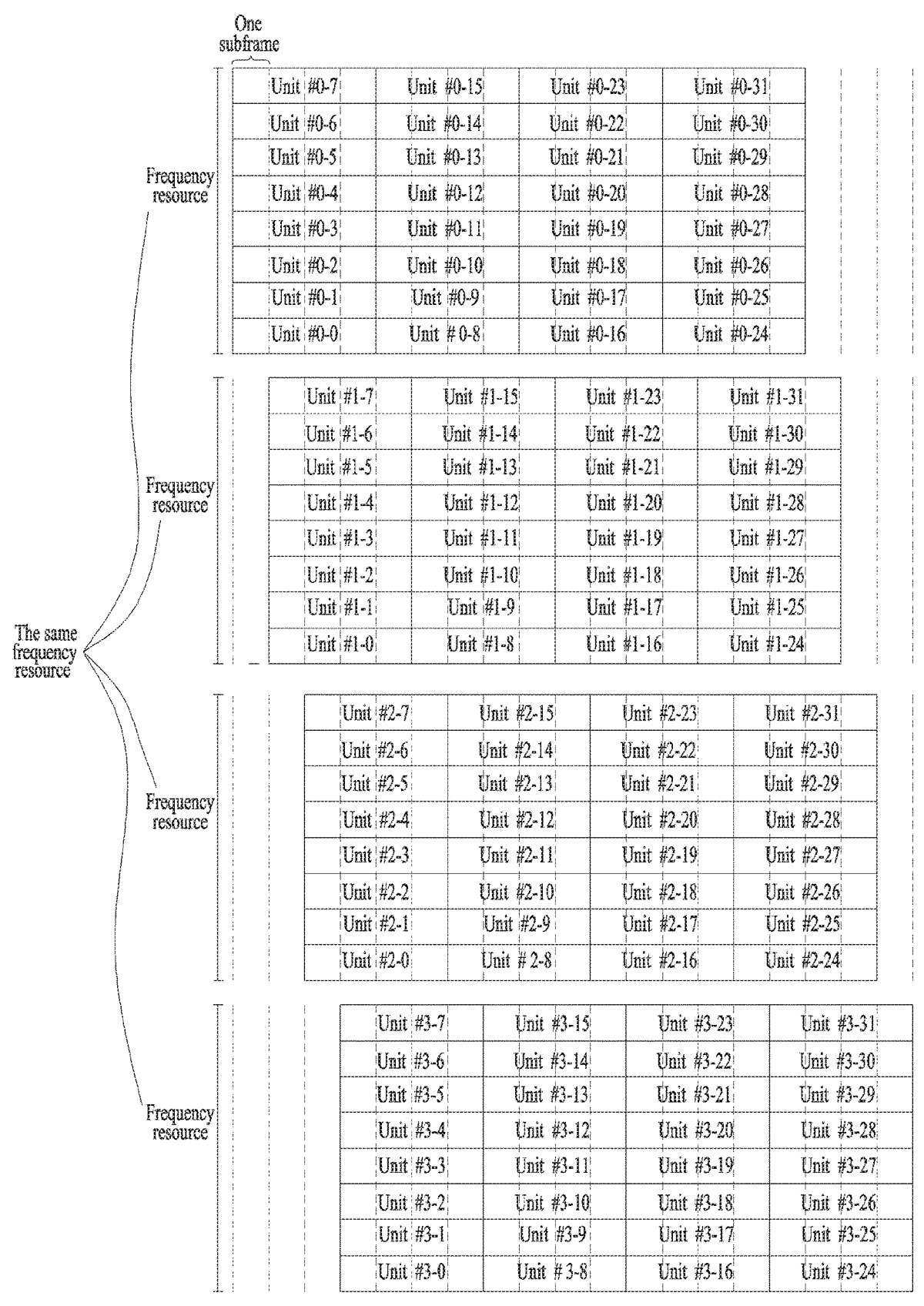

FIG. 23 illustrates another exemplary method for configuring RUs according to another embodiment of the present disclosure.

Referring to FIG. 23, RUs having different starting times may share the same frequency area, unlike FIG. 22. According to this resource allocation method, since the number of RUs available for a UE to start transmission at a specific time point is increased, compared to the structure of FIG. 20, resource utilization is increased, and the probability of resource collision with another UE initiating transmission at the same time point is decreased. In this case, however, use of the same frequency resource unit may be allowed, only when it is determined in advance that other UEs do not occupy the corresponding frequency resources, by the aforedescribed energy sensing or reading of control information for the other UEs.

For example, when a first UE transmits a first D2D signal in Unit #0-0 to Unit #0-7, a second D2D signal may be generated in a second UE in the middle of the first subframe. In this case, the second UE is able to transmit the second D2D signal in Unit #1-0 to Unit #1-7, without waiting until the staring time of Unit #0-8. However, the second UE uses an RU that does not overlap with an RU used by the first UE by detecting a signal of the first UE.

To describe the embodiment of FIG. 23 in greater detail, in the case where one RU occupies 4 contiguous subframes and a total frequency is divided into 8 units, Unit #X-Y is obtained by shifting the starting time of Unit #Y relatively by X subframes. As a consequence, for example, Unit #0-8 and Unit #1-8 use the same frequency, but Unit #1-8 is obtained by shifting Unit #0-8 backward by one subframe. If a specific UE is to use Unit #1-8, the UE should determine that overlapped units, that is, Unit #0-8, Unit #2-0, and Unit #3-0 are empty. To make this decision, the UE may determine whether the corresponding resources are used, by preliminary sensing or preliminarily transmitted control information.

Figure 24:
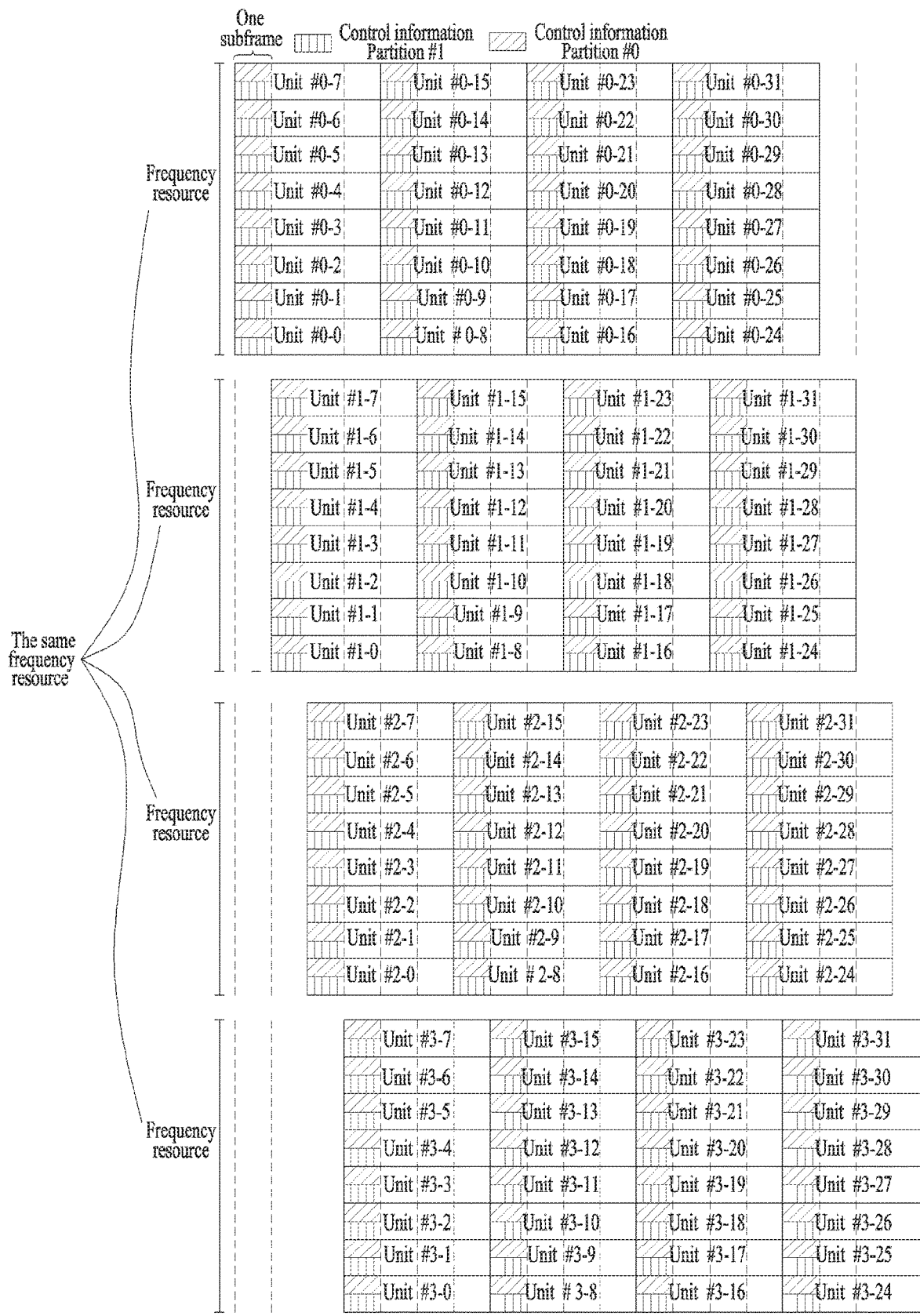
FIG. 24 is a view illustrating an exemplary allocation of control resources according to another embodiment of the present disclosure.

As described before, control information may also be transmitted in a starting part of each unit in the structure of FIG. 23. FIG. 24 illustrates a case in which two candidate areas for control information exist in one unit, which is similar to the case illustrated in FIG. 22.

Meanwhile, if all units are activated in the resource structure in which a plurality of units are overlapped in frequency and have different starting times, as illustrated in FIGS. 23 and 24, implementation of a UE may be excessively complex. Particularly, energy sensing or an increased number of decodings of control information for determining whether other UEs transmit signals may cause a problem.

To avert the problem, only a part of the units may be activated. It may be configured that a different set of units are activated according to the ID of a UE so that different UEs may use different units. Or it may be configured that a different set of units are activated according to the priority or category of a message to be transmitted, so that messages of different priority or categories may be transmitted in different resources without interference.

For example, if the condition that Unit #X-Y is activated only when the remainders of dividing X and Y by 4 are equal is imposed, the resulting structure is identical to the structure illustrated in FIG. 20. Specifically, the resource structure is identical to the structure illustrated in FIG. 20 in that Unit #0-0 and Unit #0-4 (the remainders are 0) are activated in RU #0, and Unit #1-1 and Unit #1-5 (the remainders are 1) are activated in RU #1 sharing the same subframes.

In another example, the structure of FIG. 24 may lead to a processing time too short for a UE to detect control information in one subframe and determine transmission resources by applying the detected control information to the following subframe. In this case, it may be regulated that control information should not be transmitted in some subframes. For example, on the assumption that Unit #1-X and Unit #3-X are not activated in FIG. 24, the UE only has to detect control information in Unit #0-X and apply the control information to transmission in Unit #2-X apart from Unit #0-X by one subframe. Therefore, a processing time as long as one subframe is allowed.

When the above-described principle is applied, a more flexible operation may be allowed by not fixing the length of each unit. Particularly, when control information is transmitted, the length of a corresponding unit may be indicated by the control information. Or a similar operation may be performed, that is, the length of each unit may be fixed, and the number of units that a corresponding transmission will use in the time domain may be indicated by the control information. In this case, although control information is transmitted in an initially unit used for a corresponding transmission, data may be transmitted at a corresponding position, instead of control information, in the subsequent transmission. The structure of transmitting control information in the same data transmission unit and the same frequency area may be advantageous in terms of overhead.

Meanwhile, it is favorable on the part of a UE to acquire information about a resource allocation for the RU of a previous index, when resources of a specific subframe or RU are selected. In this case, as resources are selected from among the remaining resources except for the resources occupied by other RUs, collision may be avoided.

For this purpose, the subframes of one unit may be incontiguous in time. For example, if only some subframes belong to a D2D resource pool, even though a unit is configured with contiguous subframes in the D2D resource pool, the subframes of the same unit may actually be spaced from each other.

Or even though a resource pool is configured to include contiguous subframes, it may be helpful to configure one unit with spaced subframes, particularly when a certain time is required to sense signals of other UEs or decode control information of other UEs. It is assumed that 3 ms is taken for a UE to sense a signal of another UE or decode control information about another UE, and starts its signal transmission using the sensing or decoding result. In this case, the UE may sense and/or decode a signal transmitted in subframe #n at the last time, and thus start transmission in subframe #n+4. In other words, operations of other UEs in subframes #n+1, #n+2, and #n+3 may not be reflected in the transmission starting in subframe #n+4. If this assumption is applied to the structure of FIG. 23, operations of other UEs in units overlapped with a unit that the UE actually transmits are not reflected, and as a result, resource collision may not be avoided. This problem may be solved by spacing subframes of one unit from each other by a predetermined gap. Particularly, the problem may be solved by maintaining a gap corresponding to the processing time.

Figure 25:
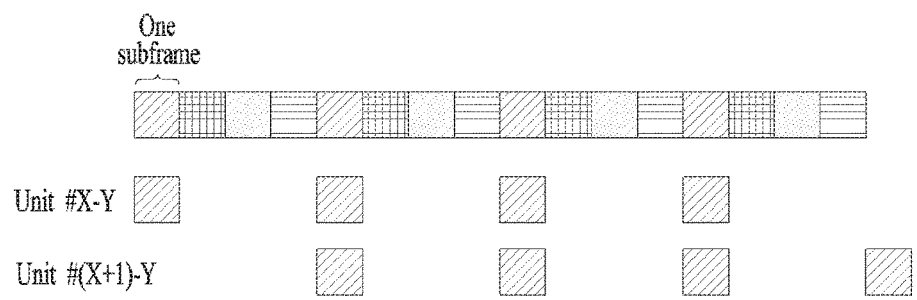
FIG. 25 is a view illustrating an exemplary RU configuration according to another embodiment of the present disclosure.

FIG. 25 illustrates an exemplary RU configuration according to another embodiment of the present disclosure.

Referring to FIG. 25, the gap between subframes in an RU may be adjusted in consideration of a processing time. For example, subframes #n, #n+4, #n+8, and #n+12 may be bound into one unit. The gap between the subframes of one unit may be used in configuring another unit based on the same principle.

In the case where the structures illustrated in FIGS. 23 and 24 are applied with the gap maintained, if Unit #X-Y uses subframes #n, #n+4, #n+8, and #n+12, Unit #(X+1)-Y obtained by shifting Unit #X-Y by one subframe in the foregoing embodiment uses subframes #n+4, #n+8, #n+12, and #n+16. Therefore, a UE that intends to use Unit #(X+1)-Y may determine whether another UE uses subframe #n of Unit #X-Y and finally determine whether to use Unit #(X+1)-Y based on the determination. As a consequence, the property that when the UE uses Unit #(X-1)-Y, the UE does not collide with a UE transmitting a signal in subframes #n+1, #n+2, and #n+3 may be maintained.

Obviously, the case illustrated in FIG. 25 is merely an embodiment of a gap between subframes in one unit, and thus may be represented in a different manner. For example, a gap may be set only between a control subframe carrying control information and a data subframe carrying data. Particularly, if the reason for forming a gap is to give a processing time for a resource selection operation by decoding control information in a starting part of a unit and thus avoiding collision, even though a gap is placed between a subframe carrying control information and a subsequent subframe carrying data, a data transmission may be completed fast by use of contiguous subframes as data transmission subframes. Herein, it may be considered that control information transmitted in a specific subframe schedules data subframes starting with a subframe spaced from the specific subframe by a predetermined number of subframes.

Figure 26:
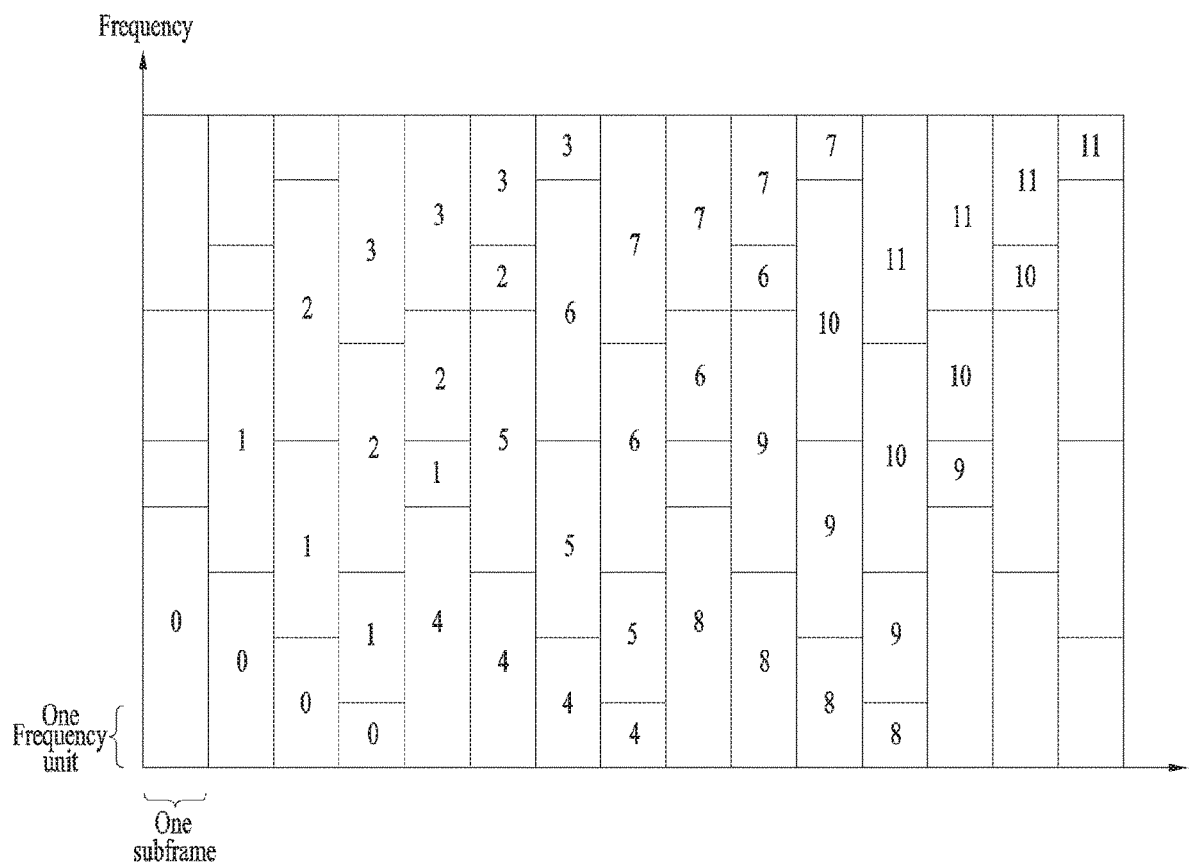
FIG. 26 is a view illustrating an exemplary frequency configuration for RUs according to the present disclosure.
Figure 27:
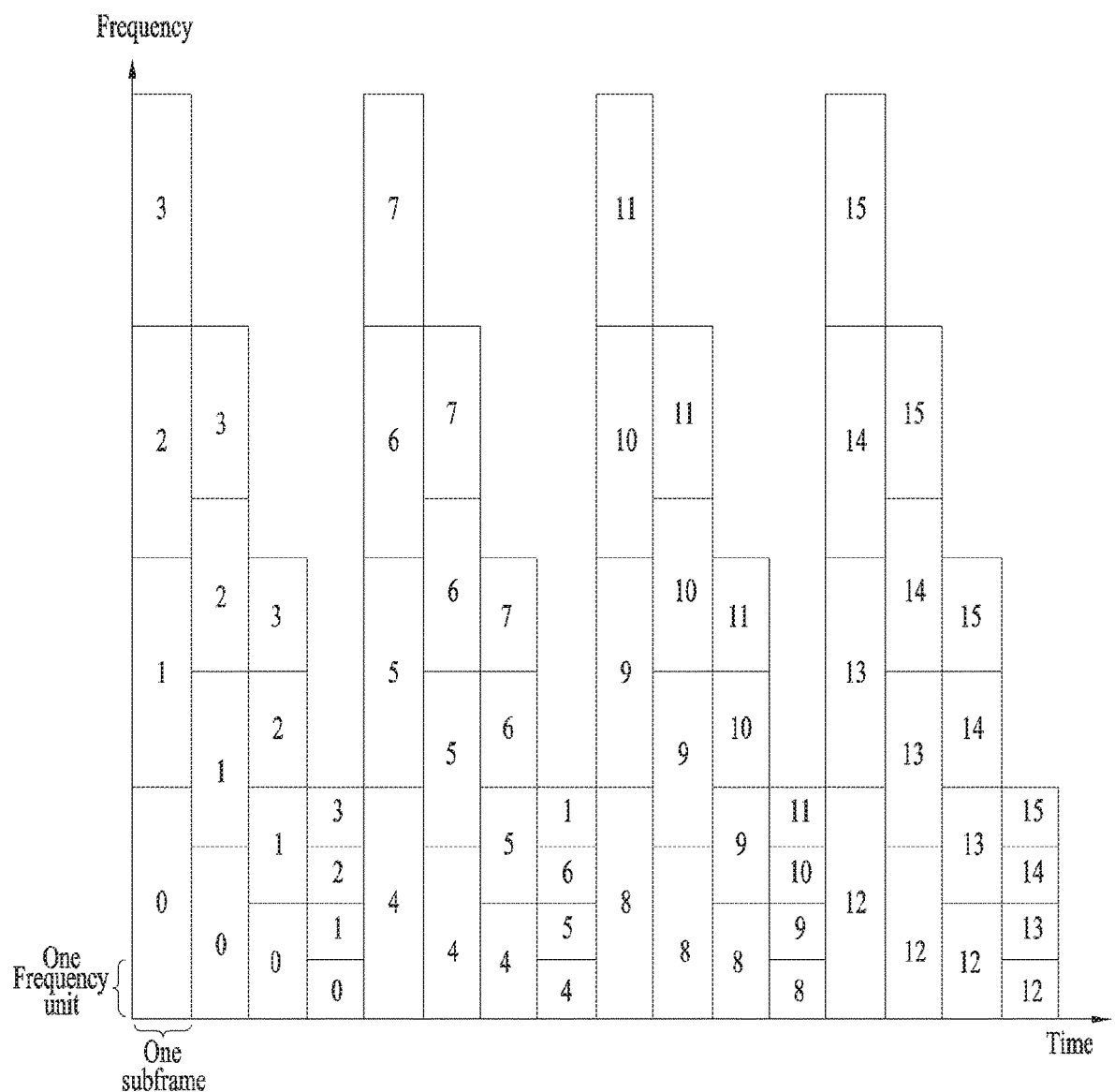
FIG. 27 is a view illustrating an exemplary frequency configuration, when the starting times of RUs are aligned with each other according to the present disclosure.

Meanwhile, for design simplicity, the size of a frequency area occupied by one RU may be equal across all subframes, as assumed in FIGS. 18, 19, and 20. However, the size of the frequency area may be controlled to utilize resources more effectively. With reference to FIGS. 26 and 27, a method for setting the size of a frequency area occupied by one RU will be described.

For example, it may be effective in terms of whole resource utilization that after a D2D message is transmitted once in one subframe, its redundancy or parity is transmitted in fewer resources. Particularly, if the D2D message includes a relatively large number of bits, a sufficiently low coding rate may be maintained by using many RBs in a few first subframes.

However, once a predetermined coding rate is achieved, total power may be maintained, instead of using a small number of RBs, that is, Power Spectral Density (PSD) may be increased, because an additional decrease in the coding rate does not offer a big gain in performance. Therefore, energy transferred through a retransmission may be maintained. This conforms with the phenomenon that if reception energy is equal in a situation where a coding rate is sufficiently low, almost a similar performance is achieved irrespective of the coding rate. Hereinbelow, an example of the above configuration will be described with reference to FIG. 26.

FIG. 26 illustrates an exemplary frequency configuration for RUs according to the present disclosure.

If each RU includes a plurality of time transmission units (e.g., subframes), a frequency area of a different size may be configured for each of the time transmission units. Referring to FIG. 26, one RU includes four subframes, with four frequency units (e.g., RBs) in the first subframe and the number of frequency units being decreased from that of the preceding one by 1 for each of the second, third, and fourth subframes. In FIG. 26, RU #n is formed by combining resources labeled by reference numeral n. Although resources labeled by no numerals may be kept empty in FIG. 26, repetition of this pattern may lead to use of an RU of the next index. Therefore, it may not occur that resources are not utilized. Further, as a result of this configuration, RU #0 and RU #1 may be configured to have frequency areas of different sizes in overlapped time areas.

As noted from the fourth subframe position in FIG. 26, although four RUs are multiplexed in one subframe, a total of 10 frequency units are consumed. On the other hand, if each of four RUs always uses four frequency units, the number of necessary frequency units is 16. Accordingly, the same RU may be generated with fewer resources according to the proposed method of the present disclosure.

The structure proposed by the present disclosure is advantageous in terms of in-band emission in which the power of a signal transmitted in a specific RB by a UE interferes with adjacent RBs. In general, a transmission using a small number of frequency resources causes less in-band emission interference than a transmission using a large number of frequency resources. Therefore, since a retransmission using fewer resources reduces in-band emission interference with an initial transmission performed at the same time point in the proposed structure, the initial transmission signal may be protected better and a neighbor UE may fast receive the initial transmission signal.

Additionally, interference with the initial transmission may further be reduced by reducing transmission power used for the retransmission. For example, the transmission power of the retransmission may be reduced finally by reducing the number of RBs used for the transmission, while PSD is maintained, as illustrated in FIG. 26. Even in the situation of FIG. 18 in which the number of RBs used for a retransmission is maintained or in the situation of FIG. 26, desired effects may be partially achieved by reducing the transmission power of the retransmission. FIG. 26 is merely an embodiment, and this principle may be generalized such that the number of frequency resources in one RU may be maintained or reduced according to the increase of the retransmission number of the same message.

If the starting times of RUs should be aligned with each other for a reason such as the simplicity of implementation of a UE based on predetermined RVs of received FDM signals, reduction of the number of RBs in the retransmission may mean that the size of a frequency area of a resource pool used for the retransmission is smaller.

FIG. 27 illustrates an exemplary frequency configuration, in the case where the starting times of RUs are aligned with each other according to the present disclosure. Referring to FIG. 27, each RU may be configured with 4 frequency units, 3 frequency units, 2 frequency units, and 1 frequency unit in four respective subframes, and the starting times of RUs may be set to be the same. As a result, in the embodiment of FIG. 27 in which four RUs are FDM-multiplexed in each D2D subframe, 16 frequency units are included in a resource pool in a subframe in which a first transmission takes place, whereas 4 frequency units are included in the resource pool in a subframe in which a fourth transmission takes place. An eNB may use resources that are not included in the resource pool during a retransmission, for another usage, for example, for the usage of transmitting a UL signal to the eNB by a UE or transmitting a D2D signal of a different type. The different type of D2D signal may be a D2D message of a relatively small size transmitted in frequency resources of a fixed size.

Figure 28:
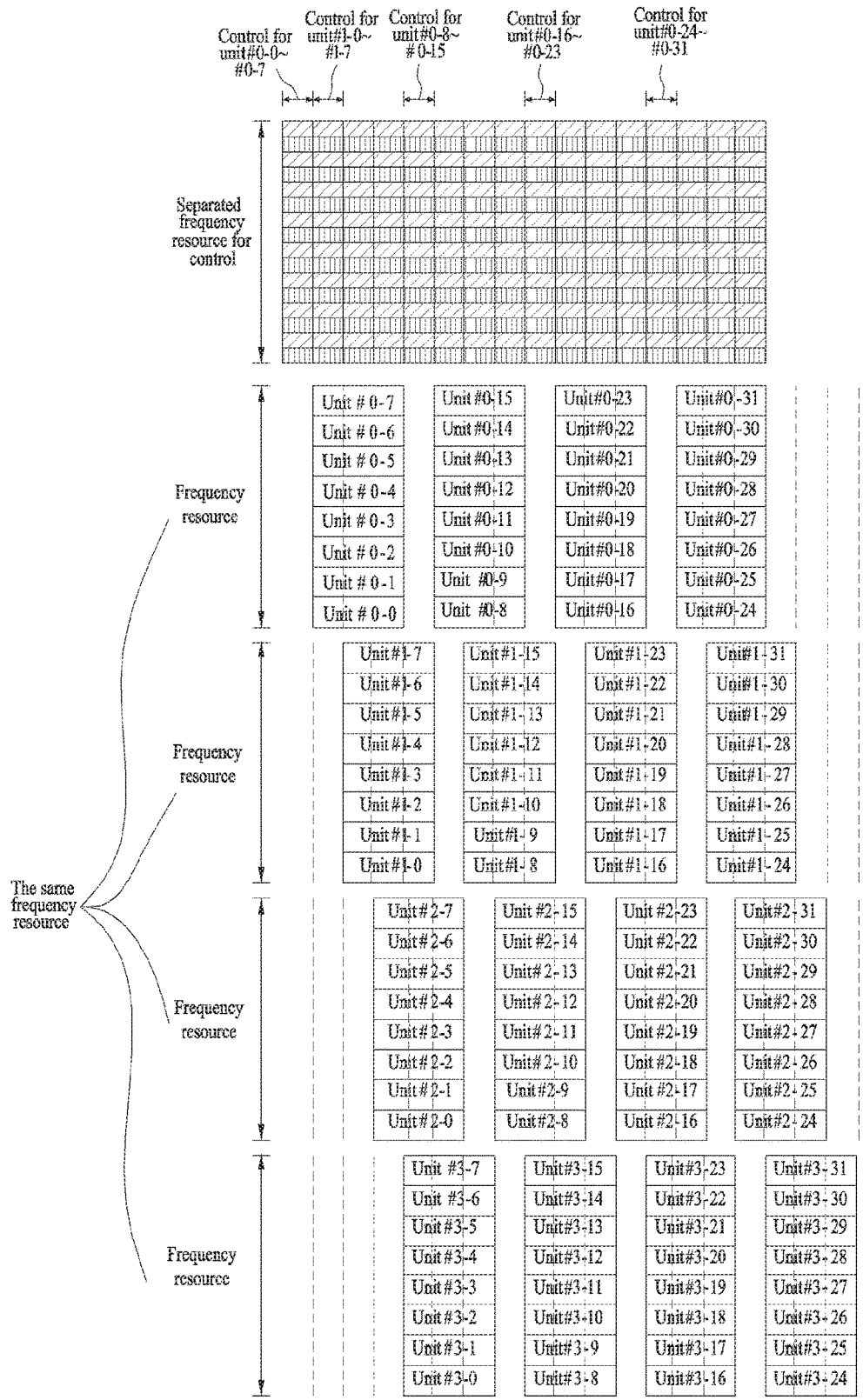
FIG. 28 is a view illustrating exemplary separation between a data channel and a control channel in the frequency domain according to another embodiment of the present disclosure.

Meanwhile, it is possible to separate the frequency position of a control channel from that of a data channel, for prevention of collision between the control channel and the data channel, while a time position of the control channel is maintained for the afore-described fast control channel transmission. FIG. 28 illustrates an example of separating a data channel from a control channel in the frequency domain according to another embodiment of the present disclosure.

FIG. 28 corresponds to a situation in which the control region of each unit or a control unit for each unit is separated to an additional frequency. In this case, to achieve frequency diversity, the control region may be separately placed in two or more frequency areas. Thus, a control channel may be protected better, with the effect of the afore-described fast initiation of an initial D2D transmission. Herein, transmitted control information may be for data transmitted in different resources in the time domain, for example, in a different subframe. That is, overlap between resources may be avoided more effectively by preliminarily transmitting control information for later-transmitted data.

For example, control information for Unit #0-0 to Unit #0-7 may be transmitted in resources separated from the frequency unit of data in the frequency domain. In this case, the control information may also be transmitted in a time transmission unit before Unit #0-0 to Unit #0-7 start. While it is described regarding RUs of FIG. 24 that an RU is divided into a control region and a data region, the expressions, control region and data region may be replaced with control unit and data unit, respectively.

Meanwhile, if a constraint on the frequency positions of a control channel and a data channel is released, it is possible to arrange the control channel and the data channel more flexibly, which is effective in increasing total performance. In this case, a distinction between units existing at the same time point may be meaningless.

Figure 29:
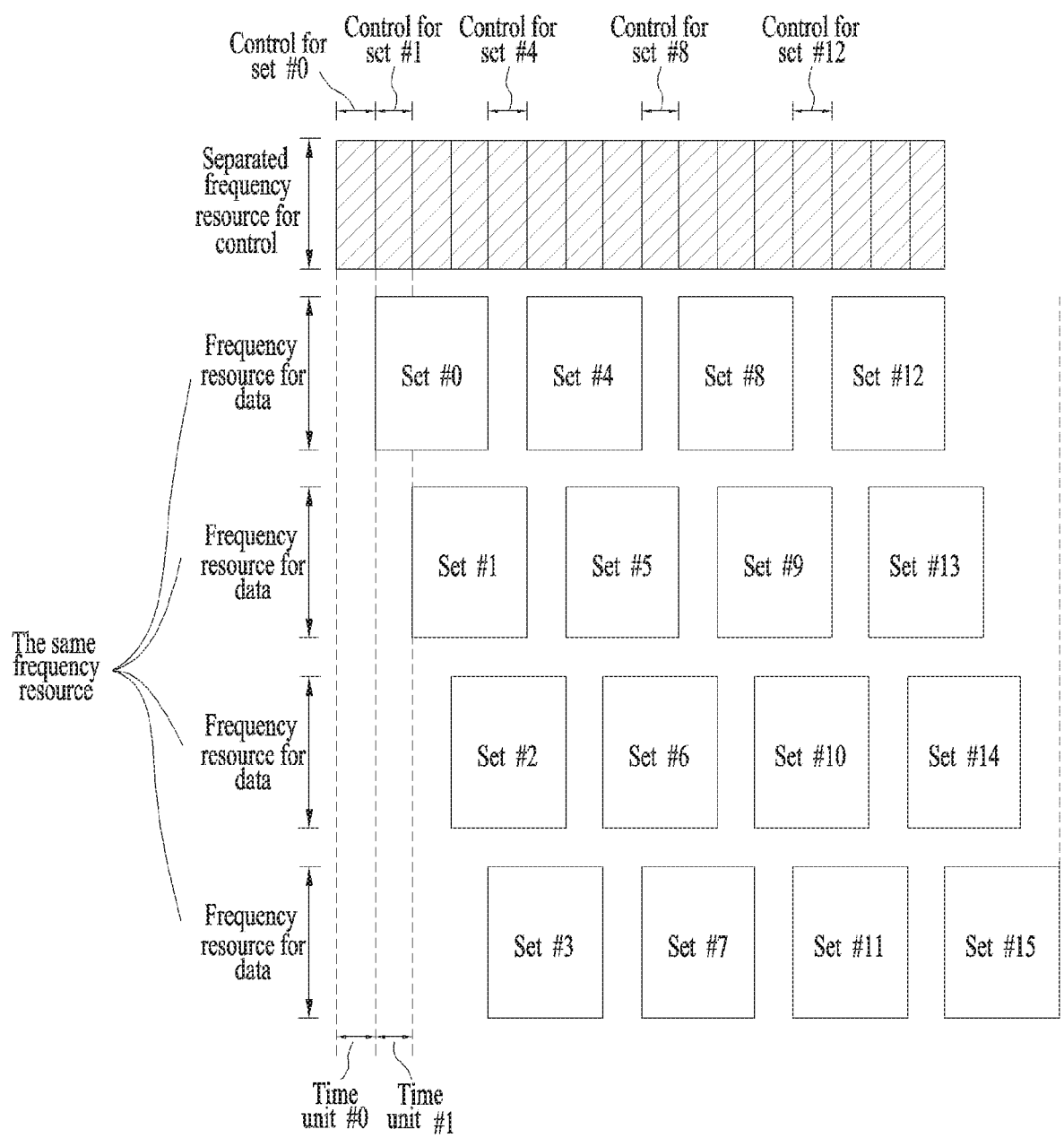
FIG. 29 is a view illustrating a modification example of another embodiment of the present disclosure.

For example, if n is constant for Units #x–(8n+y) in the embodiment of FIG. 28, boundaries between units with 0≤y≤7 may be omitted. Then, the embodiment of FIG. 28 may be changed to FIG. 29. In FIG. 29, set #(4n+x) corresponds to a set of Units #x–(8n+y) (0≤y≤7) in combination. Referring to FIG. 29, an RU set may correspond to a resource pool in a sidelink system.

The embodiment of FIG. 29 is characterized in that if a control set configured for the purpose of control is available in time unit n, and a UE has data to be transmitted, the UE transmits a control channel in certain resources of a control set at a corresponding time point. Then, the UE transmits data in a data resource set linked to the control set. Herein, the data is transmitted in data resource set #n including time units n+1, n+2, and n+3.

An RU set may correspond to a data pool in which data is transmitted, and a region carrying control information about the corresponding RU set may correspond to a control pool. That is, this structure is similar to a current structure in which a data pool for data is linked to a control resource pool for control information. For example, control information transmitted in control set #0 may include information about data transmitted in data set #0. Further, in this structure, control information and data may be TDM-multiplexed. On the other hand, this structure is different from the current structure in that different data sets are overlapped through partial offset or shift.

The operation of FIG. 29 is characterized in that each individual control resource set occupies a relatively short time area, without being overlapped with other individual control resource sets. On the other hand, the length of the time area of an individual data resource set is a multiple of that of the time area of an individual control resource set. As a result, a plurality of data resource sets are partially overlapped with each other in time. In other words, a data resource set starts before the previous data resource set ends. Due to the structural feature, a time delay involved in initiating a D2D transmission may be shortened.

In a method for implementing the principle of FIG. 29 in a different manner, while the lengths of the time areas of a control resource set and a data resource set are maintained equal, one control resource set may be linked to a plurality of data resource sets. For example, if each data resource set is interpreted as a combination of three data resource sets having one RU length in FIG. 29, the same operation as illustrated in FIG. 29 may be realized by applying control information in time unit #n to a data resource set in time units #n+1, #n+2, and #n+3. This means that one control resource set is liked to a plurality of data resource sets.

As described before, a basic time resource unit may be one subframe, or a group of a plurality of subframes. If a UE has data to be transmitted in time resource unit n+1, the UE may transmit a control channel in time unit n+1 and then data in time units n+2, n+3, and n+4.

Therefore, if each time unit is not very long, a time taken from data generation to transmission initiation may be maintained to be a sufficiently small value. Since the UE may initiate a control channel transmission in each time unit owing to this structure, a time delay until initiation of a control channel transmission may be reduced. Further, since a data transmission in a plurality of time units is scheduled by use of one time unit, control channel overhead may be reduced.

5. Apparatuses

Figure 30:
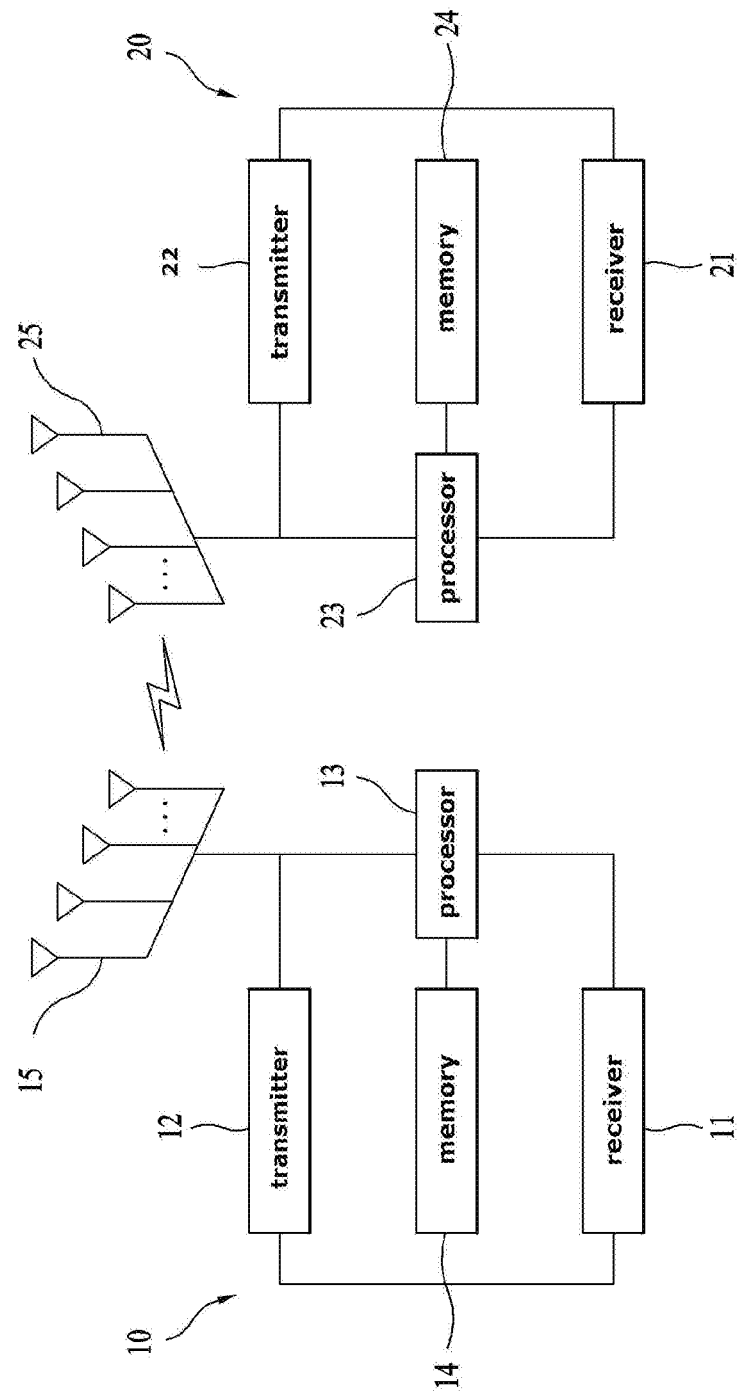
FIG. 30 is a block diagram of apparatuses for implementing the methods illustrated in FIGS. 1 to 29.

The apparatuses described with reference to FIG. 30 are means for performing the methods illustrated in FIGS. 1 to 29.

A UE may operate as a transmitter on UL and as a receiver on DL. An eNB may operate as a receiver on UL and as a transmitter on DL.

That is, each of the UE and the eNB may include a Transmitter (Tx) 12 or 22 and a Receiver (Rx) 11 or 21, for controlling transmission and reception of information, data, and/or messages, and an antenna 15 or 25 for transmitting and receiving information, data, and/or messages.

Each of the UE and the eNB may further include a processor 13 or 23 for implementing the afore-described embodiments of the present disclosure and a memory 14 or 24 for temporarily or permanently storing operations of the processor 13 or 23.

The embodiments of the present disclosure may be implemented using the above-described components and functions of a UE and an eNB. For example, the UE may configure a first RU and a second RU so that they may overlap with each other on a time transmission unit basis. The UE may also configure the first RU and the second RU so that they may have different frequency areas. Or the UE may configure the first RU and the second RU in the same frequency area. This overlapped resource structure may reduce a waiting time until transmission of an emergency signal.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 20 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 3280 or 3290 and executed by the processor 3220 or 3230. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for allocating transmission resources by a User Equipment (UE) in a wireless communication system supporting Device-to-Device (D2D) communication, the method comprising:
   transmitting a first D2D signal in a first resource;
   generating a second D2D signal during a transmission period of the first resource; and
   transmitting the second D2D signal in a second resource,
   wherein each of the first resource and the second resource includes four consecutive subframes,
   wherein the first resource and the second resource include a first subframe overlapping each other in a time domain,
   wherein a starting subframe of the first resource is earlier than a starting subframe of the second resource by a preconfigured time gap in units of subframes,
   wherein a number of resource blocks allocated in the frequency domain to each of the four consecutive subframes is different from each other, and
   wherein a number of resource blocks allocated as the first resource in the first subframe is smaller than a number of resource blocks allocated as the second resource in the first subframe.

2. The method according to claim 1, wherein control information for the first D2D signal is located in a start subframe of the first resource, and a control information for the second D2D signal is located in a start subframe of the second resource.

3. The method according to claim 2, wherein at least one of the control information for the first D2D signal and the control information for the second D2D signal is mapped to at least one of frequency partitions into which a resource unit for at least one of the control information for the first D2D signal and the control information for the second D2D signal is divided in a frequency domain.

4. The method according to claim 1, wherein the first resource and the second resource have frequency region of different sizes in an overlapped time region.

5. A method for allocating reception resources by a User Equipment (UE) in a wireless communication system supporting Device-to-Device (D2D) communication, the method comprising:
receiving a first D2D signal in a first resource; and
receiving a second D2D signal in a second resource,
wherein each of the first resource and the second resource includes four consecutive subframes,
wherein the first resource and the second resource include a first at least one subframe overlapping each other in a time domain,
wherein a starting subframe of the first resource is earlier than a starting subframe of the second resource by a preconfigured time gap in units of subframes,
wherein a number of resource blocks allocated in the frequency domain to each of the four consecutive subframes is different from each other, and
wherein a number of resource blocks allocated as the first resource in the first subframe is smaller than a number of resource blocks allocated as the second resource in the first subframe.

6. A User Equipment (UE) performing Device-to-Device (D2D) communication, the UE comprising:
a transmitter; and
a processor configured to:
control the transmitter to transmit a first D2D signal in a first resource;
generate a second D2D signal during a transmission period of the first resource; and
control the transmitter to transmit the second D2D signal in a second resource,
wherein each of the first resource and the second resource includes four consecutive subframes,
wherein the first resource and the second resource include a first subframe overlapping each other in a time domain,
wherein a starting subframe of the first resource is earlier than a starting subframe of the second resource by a preconfigured time gap in units of subframes, and
wherein a number of resource blocks allocated in the frequency domain to each of the four consecutive subframes is different from each other, and
wherein a number of resource blocks allocated as the first resource in the first subframe is smaller than a number of resource blocks allocated as the second resource in the first subframe.

7. A User Equipment (UE) performing Device-to-Device (D2D) communication, the UE comprising:
a receiver; and
a processor configured to:
control the receiver to receive a first D2D signal in a first resource; and
control the receiver to receive a second D2D signal in a second resource,
wherein each of the first resource and the second resource includes four consecutive subframes,
wherein the first resource and the second resource include a first subframe overlapping each other in a time domain,
wherein a starting subframe of the first resource is earlier than a starting subframe of the second resource by a preconfigured time gap in units of subframes,
wherein the number of resource blocks allocated in the frequency domain to each of the four consecutive subframes is different from each other, and
wherein a number of resource blocks allocated as the first resource in the first subframe is smaller than a number of resource blocks allocated as the second resource in the first subframe.

* * * * *